(12) United States Patent
Buffi

(10) Patent No.: US 11,570,942 B1
(45) Date of Patent: Feb. 7, 2023

(54) COMBINATION FARMING IMPLEMENT

(71) Applicant: Buffindustries LLC, Aberdeen, ID (US)

(72) Inventor: Rhett D. Buffi, Aberdeen, ID (US)

(73) Assignee: Buffindustries LLC, Aberdeen, ID (US)

( * ) Notice: Subject to any disclaimer, the term of this patent is extended or adjusted under 35 U.S.C. 154(b) by 322 days.

(21) Appl. No.: 16/905,137

(22) Filed: Jun. 18, 2020

Related U.S. Application Data

(60) Provisional application No. 63/017,392, filed on Apr. 29, 2020.

(51) Int. Cl.
*A01B 59/00* (2006.01)
*A01B 49/02* (2006.01)
*A01B 59/06* (2006.01)
*A01B 63/10* (2006.01)
*A01B 31/00* (2006.01)
*A01B 35/10* (2006.01)
*A01B 35/16* (2006.01)
*A01B 29/04* (2006.01)

(52) U.S. Cl.
CPC .......... *A01B 59/002* (2013.01); *A01B 49/02* (2013.01); *A01B 59/06* (2013.01); *A01B 63/10* (2013.01); *A01B 29/048* (2013.01); *A01B 31/00* (2013.01); *A01B 35/10* (2013.01); *A01B 35/16* (2013.01)

(58) Field of Classification Search
CPC ... E02F 3/964; E02F 3/96; E02F 3/963; E02F 3/7604; A01B 59/002; A01B 59/06; A01B 49/02; A01B 63/10; A01B 29/048; A01B 31/00; A01B 35/10; A01B 35/16
See application file for complete search history.

(56) References Cited

U.S. PATENT DOCUMENTS

| | | | | | |
|---|---|---|---|---|---|
| 3,213,554 | A | * | 10/1965 | Dalton | E02F 3/7604 172/197 |
| 4,067,396 | A | * | 1/1978 | Watts | A01B 3/4215 172/482 |
| 4,100,688 | A | * | 7/1978 | Grist | E02F 3/3631 404/127 |
| 5,114,299 | A | * | 5/1992 | Roche | E02F 3/404 414/722 |
| 5,121,557 | A | * | 6/1992 | Moore | E02F 3/352 37/406 |
| 5,404,660 | A | * | 4/1995 | Webster | E02F 3/96 414/718 |
| 5,938,399 | A | * | 8/1999 | Knutson | E02F 3/3681 37/468 |

(Continued)

*Primary Examiner* — Jamie L McGowan
(74) *Attorney, Agent, or Firm* — Hawley Troxell; Rivkah Young

(57) ABSTRACT

A cultivator function is coupled with a scraper function in a single implement such that the cultivator portion and the scraper portion of the combination farming implement, when attached to a vehicle, can be mechanically and remotely changed out at any time. The cultivator portion and the scraper portion of the combination farming implement are positioned on opposite sides of a rotating framework, such that the combination farming implement can be mechanically and remotely rotated during use in the field, thus enabling the performance of both the cultivator function and the scraper function without a vehicle operator ever leaving the vehicle.

10 Claims, 15 Drawing Sheets

(56) References Cited

U.S. PATENT DOCUMENTS

| | | | | |
|---|---|---|---|---|
| 6,360,459 | B1* | 3/2002 | Brookhart | E02F 3/345 |
| | | | | 37/234 |
| 8,534,371 | B2* | 9/2013 | Roessler | A01B 43/00 |
| | | | | 171/12 |
| 8,657,024 | B2* | 2/2014 | Fraley | A01B 31/00 |
| | | | | 172/196 |
| 10,480,152 | B1* | 11/2019 | Smith | E02F 3/3686 |
| 10,704,224 | B1* | 7/2020 | Hauer | E02F 9/2271 |
| 11,105,064 | B2* | 8/2021 | Smith | E02F 3/3686 |
| 2004/0050564 | A1* | 3/2004 | Wilson | A01B 31/00 |
| | | | | 172/684.5 |
| 2006/0182599 | A1* | 8/2006 | Potter | E02F 3/3677 |
| | | | | 414/723 |
| 2009/0096190 | A1* | 4/2009 | Sharp | E02F 3/3677 |
| | | | | 280/727 |
| 2015/0139716 | A1* | 5/2015 | Schmidt | E02F 3/3686 |
| | | | | 403/72 |
| 2015/0337519 | A1* | 11/2015 | White | E02F 3/96 |
| | | | | 29/426.3 |
| 2018/0187392 | A1* | 7/2018 | Wegner | E02F 3/3414 |
| 2019/0119881 | A1* | 4/2019 | Honermann | E02F 3/966 |

\* cited by examiner

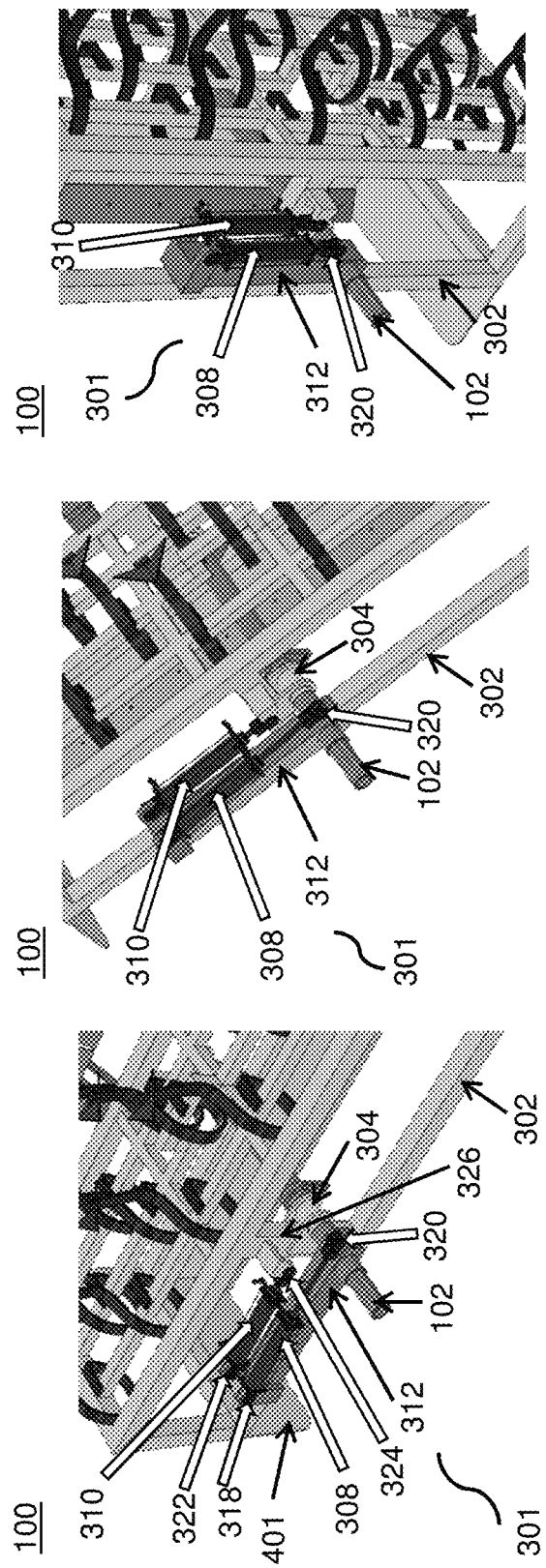
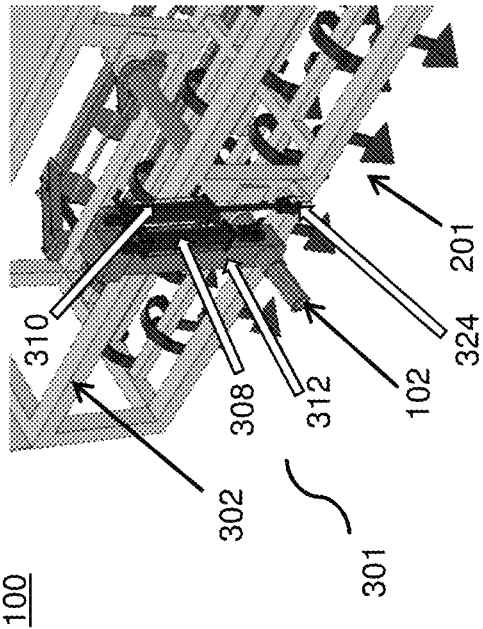
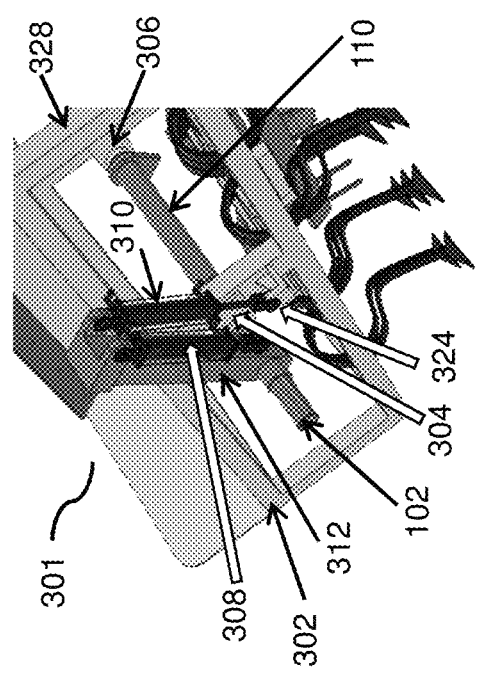
FIG. 5A
FIG. 5B
FIG. 5C
FIG. 5D
FIG. 5E (FRONT VIEW)

(RIGHT SIDE VIEW)

(BACK VIEW)

(TOP VIEW)

(MAIN FRAME FRONT VIEW)

(MAIN FRAME TOP VIEW)

(MAIN FRAME RIGHT SIDE VIEW)

COMBINATION FARMING IMPLEMENT

RELATED APPLICATIONS

This application claims priority to Buffi, U.S. Provisional Patent Application No. 63/017,392, filed on Apr. 29, 2020, entitled "COMBINATION FARMING IMPLEMENT," which is herein incorporated by reference in its entirety as if it were fully set forth herein.

BACKGROUND

In the farming industry, many different types of implements exist to assist agricultural professionals with the various machine and labor-intensive tasks required to prepare, maintain, and harvest fields. Examples of such implements include plows, harrows, seeders, combines, tillers, cultivators, and scrapers. These farming implements and others are routinely used by those in the industry to accomplish a variety of agricultural tasks. These types of farming implements are typically large, bulky, and costly pieces of equipment, which require significant resources to efficiently utilize, store, and maintain. Many types of farming implements, such as cultivators and scrapers, are designed to be hitched to the back of a tractor or other agricultural vehicle. Once hitched, these farming implements are typically pulled behind the vehicle to perform each implement's specific task. While the currently available implements are capable of performing their intended functions, their use often comes at a significant cost in terms of time, labor, money, and other resources such as storage space and maintenance.

As one illustrative example, after planting crops in a field, the soil bordering the crops should be routinely maintained to prevent weeds and other undesirable elements from interfering with proper growth of the crops. This is typically done using an implement such as a cultivator, which breaks up the bordering soil surface to remove any weeds, trash, or other types of debris from the soil, thus ensuring proper growth of the nearby crops. Additionally, it is often desirable to level and smooth out the soil, for example, to fill in ruts that may have been created by vehicles or other equipment during field maintenance operations. Each of these processes requires a number of time consuming, costly, and potentially dangerous steps, as each farm implement, once used for its specific task, is changed out for the next implement and task. To make matters worse, this changing out process must then typically be repeated for each new row, field, or other section of farmland.

In order to perform the cultivation task, a first implement, such as a cultivator, must be retrieved from a storage facility and manually attached to an agricultural vehicle for use. Traditional industrial cultivators are made out of metal, are very heavy, and typically have sharp metal teeth used for loosening the soil. Thus the process of retrieving and transporting, this implement is very time-consuming and has the potential to result in injuries to the individual responsible for the task. Further, once the cultivator has been retrieved from storage, several time-consuming steps must be taken to manually attach the implement to the vehicle. This usually involves taking into consideration the category and size of the vehicle the implement is being mounted to, as well as the hitch type, pin hole size, and pin hole configuration of the implement, which often varies depending on the specific make and model of the implement. Once the cultivator has been mounted to the vehicle, the vehicle equipped with the cultivator must then be driven along multiple portions of the field one or more times to accomplish the cultivation task. After the cultivation task, the cultivator implement must then be transported back to the storage facility and manually detached from the vehicle to store the first cultivator implement and prepare the vehicle for use of a second implement.

As noted above, after cultivation, it is often desirable to level and smooth out the soil and/or areas used to access various rows, individual fields, and other crop sub-sections. This is typically done using a scraping implement, such as a box or blade scraper. As with the cultivator, the scraping implement is also typically made out of metal, is very heavy, and has sharp edges used for leveling the soil. Further, as discussed above, special considerations often need to be taken into account to properly mount the scraping implement to the vehicle. Thus the process of retrieving, transporting, and mounting this implement is also time-consuming, and rife with opportunities for injury. Once the scraper has been retrieved and mounted to a farming vehicle, the vehicle equipped with the scraper must then be driven along at least a portion of the fields one or more times in order to accomplish the scraping task. After the scraping task, the scraping implement is typically transported back to the storage facility and manually detached from the vehicle in order store the scraper implement and to prepare the vehicle for any additional tasks.

As seen above, to perform the cultivating and scraping of fields using currently available farm implements, a separate cultivator implement and scraper implement must be purchased, stored, and maintained. This in and of itself is problematic due to the cost of the two separate implements, the need to store two relatively large pieces of equipment in expensive barn or shed space built on valuable land that could be put to better use for growing crops, and the need to perform maintenance on two separate implements with different maintenance requirements, tools and parts, often from two separate manufacturers.

In addition, as described above, using currently available separate cultivator and scraper implements requires a farmer/worker to transport both implements to the fields for use, attach/hitch the first implement, such as the cultivator, to a vehicle for use (this is often done manually), use the first implement, detach the first implement (again often done manually), attach the second implement, such as the scraper (again often done manually), use the second implement, and then repeat the process each time the first implement is needed and then again when the second implement is needed. Not only is this clearly an inefficient use of time, energy, and other resources, but the process is also potentially hazardous because each change of equipment, e.g., the attachment and detachment of each implement, represents an opportunity for human error, accidents, and injuries. In addition, each time one implement is exchanged for the other, the farmer/worker must typically stop the tractor or other vehicle, dismount the vehicle (also risking injury, particularly when multiple vehicles are being used in the fields at the same time), manually detach one implement, then attach the second implement, and then get back in/on the tractor or other vehicle. Consequently, using currently available cultivator and scraper implements results in a significant amount of time being used to change out implements in an a time-critical industry where there is a need to maximize the time spent actually cultivating and scraping and not wasting time changing out implements.

Thus, the traditional options for performing cultivation and scraping tasks result in significant waste of time, money, energy, and storage space. Further, the traditional options for performing these agricultural tasks cause unneeded wear and tear on the fields, as well as on farming vehicles as they transport multiple implements to and from the fields. Additionally, the traditional options also carry a significant safety risk to the individuals responsible for performing these tasks.

In addition to farms and fields, both cultivators and scrapers can also be used on other surfaces, such as, but not limited to, arenas, parking lots, event grounds, such as fair grounds, and virtually any surface where a uniform and groomed surface is desired. Like fields, the grooming of these surfaces also currently requires two separate implements and therefore suffers from the same inefficiencies discussed above.

What is needed therefore is a combination farming implement with the capability of efficiently and effectively performing multiple agricultural and/or maintenance tasks without the need for manually transporting, attaching, detaching, storing, and maintaining multiple implements between tasks.

SUMMARY

The disclosure presented herein addresses the above technical problems by providing a combined system for efficiently and effectively performing multiple agricultural and/or maintenance tasks without the need for manually transporting, attaching, detaching, storing, and maintaining multiple implements between tasks.

In the embodiments disclosed herein, a cultivator function is coupled with a scraper function, such that the cultivator portion and the scraper portion of the combination farming implement, when attached to a vehicle, can be mechanically and remotely changed out at any time. In one embodiment, this is performed without a vehicle operator ever leaving the vehicle. Consequently, using the disclosed embodiments, the cultivator and scraper functions can be performed by a single implement without the need to transport, attach, detach, store, or maintain separate implements.

In one embodiment, the cultivator portion and the scraper portion of the combination farming implement are positioned on opposite sides of a rotating framework, such that the combination farming implement can be mechanically and remotely rotated during use in the field, thus enabling the performance of both the cultivator function and the scraper function without a vehicle operator ever leaving the vehicle.

Consequently, the embodiments disclosed herein provide a technical solution to the technical problems presented by the current and traditional options for performing cultivation and scraping tasks, options which result in significant waste of time, money, energy, and storage space, and also carry significant safety risks to the individuals responsible for performing these tasks.

BRIEF DESCRIPTION OF THE DRAWINGS

FIG. 5A, FIG. 5B, FIG. 5C, FIG. 5D, and FIG. 5E are detail views of a rotating mechanism component undergoing various stages of a rotation process, in accordance with one embodiment.

Figure 1:
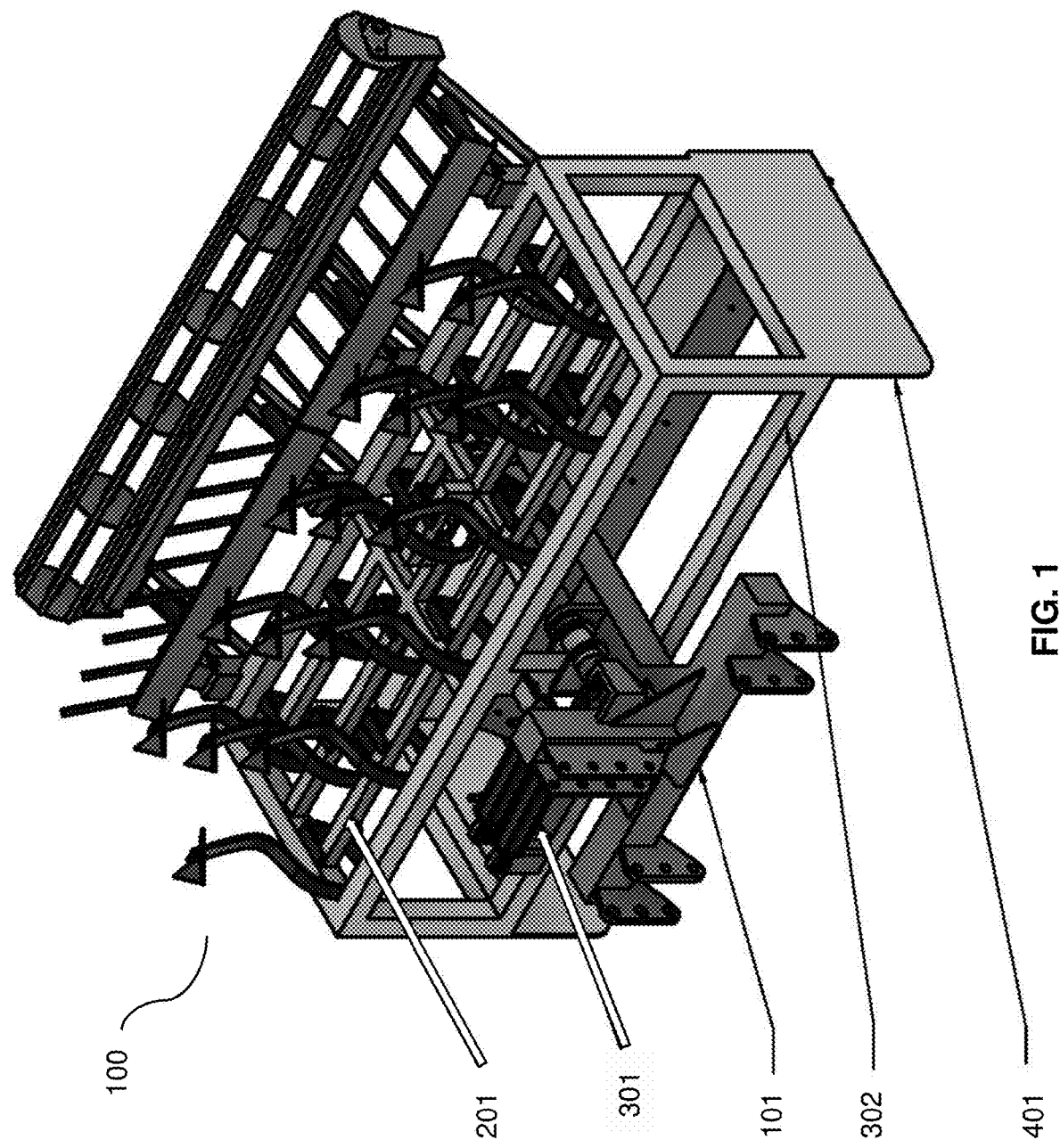
FIG. 1 is an angled overhead view of a combination farming implement, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

In accordance with the embodiments disclosed herein, a cultivator function is coupled with a scraper function, such that the cultivator portion and the scraper portion of the combination farming implement, when attached to a vehicle, can be mechanically and remotely changed out at any time. In one embodiment, this is performed without a vehicle operator ever leaving the vehicle. Consequently, using the disclosed embodiments, the cultivator and scraper functions can be performed by a single implement without the need to transport, attach, detach, store, or maintain separate implements.

In various embodiments, the combination farming implement may be used on farms and fields, however, the disclosed embodiments can also be used on other surfaces, such as, but not limited to, arenas, parking lots, event grounds, such as fair grounds, and virtually any surface where a uniform and groomed surface is desired. As noted above, the grooming of each of these surfaces currently requires two separate implements and therefore the process suffers from significant inefficiencies. However, using the embodiments disclosed herein, these inefficiencies can be avoided.

FIG. 1 is an angled overhead view of combination farming implement 100, in accordance with one embodiment.

As shown in FIG. 1, in one embodiment, combination farming implement 100 features four primary components. In the illustrative embodiment depicted in FIG. 1, the first primary component is the main frame 101, which supports the hardware for attaching combination farming implement 100 to a vehicle, and further supports hardware that allows for rotation of combination farming implement 100. The second primary component is the cultivator 201, which performs the function of breaking up a ground or soil surface. The third primary component is rotating mechanism 301, which enables the combination farming implement 100 to rotate for performance of different functions. Also shown in FIG. 1 is a sub-component of rotating mechanism 301, rotating framework 302, which is the framework that allows the combination farming implement 100 to be rotated from one position to another. The fourth primary component is box scraper 401, which performs the function of leveling out and/or smoothing a ground or soil surface. Each of these components will be discussed in further detail below.

FIG. 2A, FIG. 2B, FIG. 2C and FIG. 2D are angled overhead views of combination farming implement 100 in different stages of a rotation process, in accordance with one embodiment.

Figure 2A:
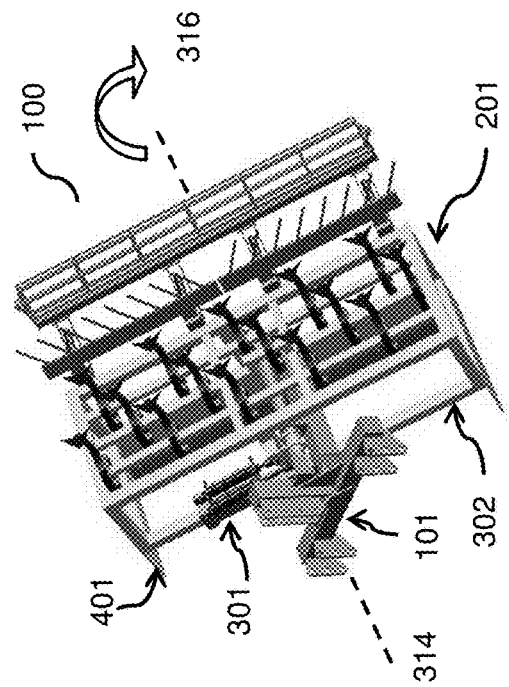
FIG. 2A, FIG. 2B, FIG. 2C and FIG. 2D are angled overhead views of a combination farming implement in different stages of a rotation process, in accordance with one embodiment.

FIG. 2A is an angled overhead view of combination farming implement 100, which shows cultivator 201 in an upward position, box scraper 401 in a downward position, the main frame 101 in a fixed position, and the rotating mechanism 301 and rotating framework 302 in a first resting position. In one embodiment, the first resting position includes box scraper 401 being in contact with a relatively flat surface, such as ground or soil. In various other embodiments, the first resting position may include box scraper 401 lifted from the ground or soil, but still in a position that is parallel to the ground or soil.

Figure 2B:
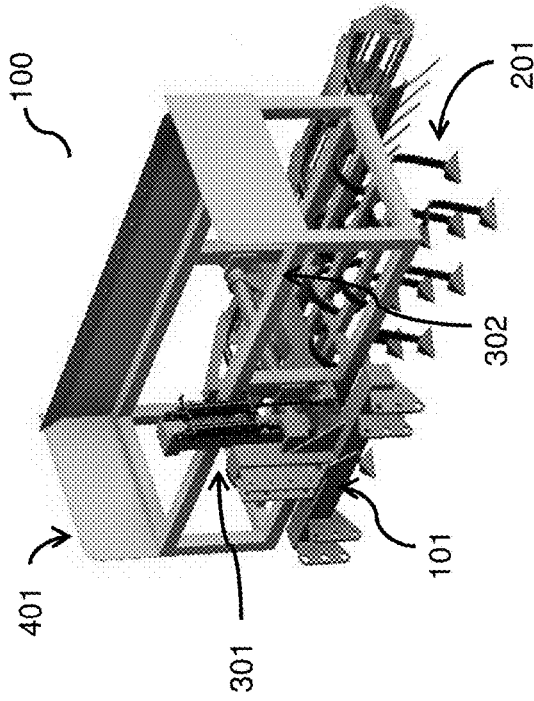

FIG. 2B is an angled overhead view of combination farming implement 100, which shows combination farming implement 100 at one possible stage during a rotation process, rotated about axis of rotation 314, approximately 45 degrees in direction of rotation 316, as measured from the position shown in FIG. 2A. In FIG. 2B, cultivator 201 and box scraper 401 are in a partially rotated position, so neither cultivator 201 nor box scraper 401 are in contact with a relatively flat surface such as ground or soil. The main frame 101 remains in a fixed position, and the rotating mechanism 301 and rotating framework 302 are performing the rotation function, which will be discussed in additional detail below.

Figure 2C:
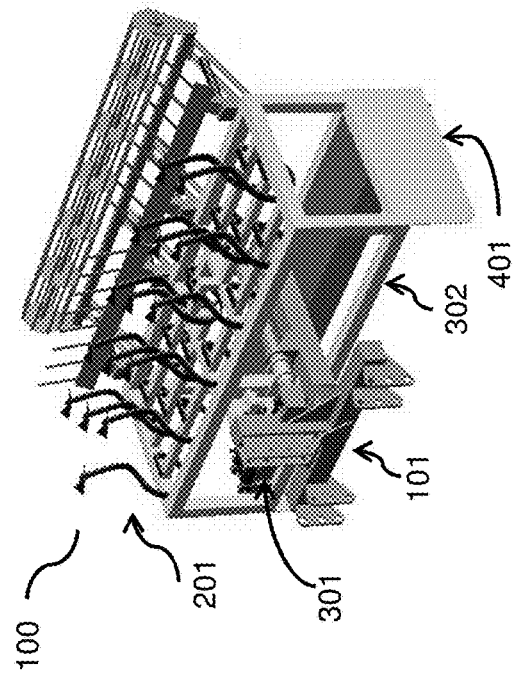

FIG. 2C is an angled overhead view of combination farming implement 100, which shows combination farming implement 100 at another possible stage during a rotation process, rotated about axis of rotation 314, approximately 135 degrees in direction of rotation 316, as measured from the position shown in FIG. 2A. In FIG. 2C, cultivator 201 and box scraper 401 are again in a partially rotated position, so neither cultivator 201 nor box scraper 401 are in contact with a relatively flat surface, such as ground or soil. The main frame 101 remains in a fixed position, and the rotating mechanism 301 and rotating framework 302 are performing the rotation function, which will be discussed in additional detail below.

Figure 2D:
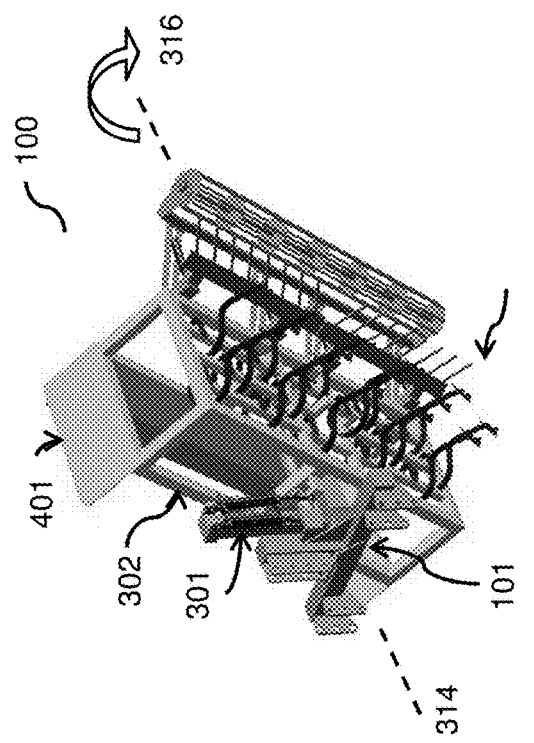

FIG. 2D is an angled overhead view of combination farming implement 100, which shows the box scraper 401 in an upward position, the cultivator 201 in a downward position, the main frame 101 remaining in a fixed position, and the rotating mechanism 301 and rotating framework 302 in a second resting position. In one embodiment, the second resting position includes cultivator 201 being in contact with a relatively flat surface, such as ground or soil. In various other embodiments, the second resting position may include cultivator 201 lifted from the ground or soil, but still in a position that is parallel to the ground or soil.

Figure 3C:
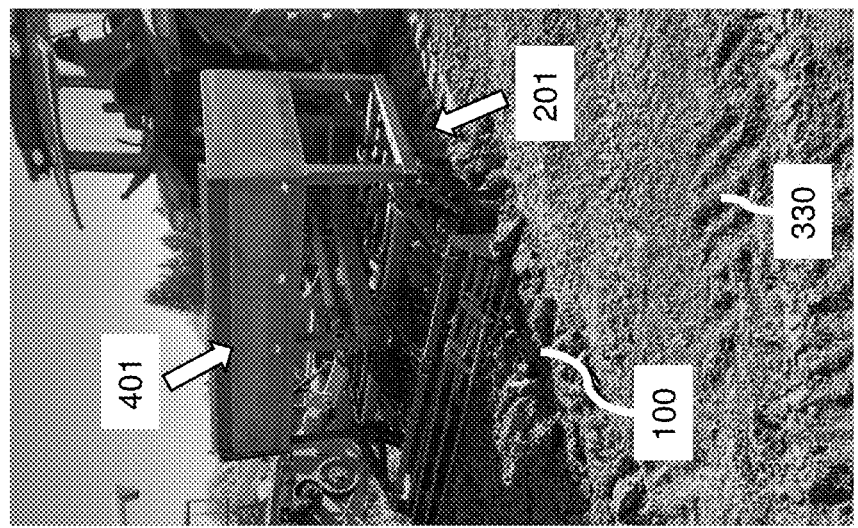
FIG. 3A, FIG. 3B, and FIG. 3C are pictorial views of a combination farming implement undergoing a rotation process while attached to a vehicle, in accordance with one embodiment.
Figure 3B:
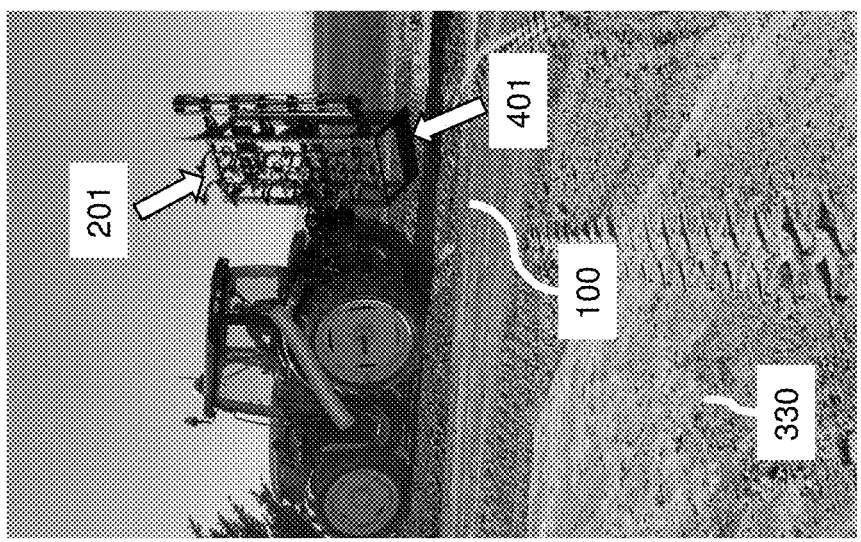
Figure 3A:
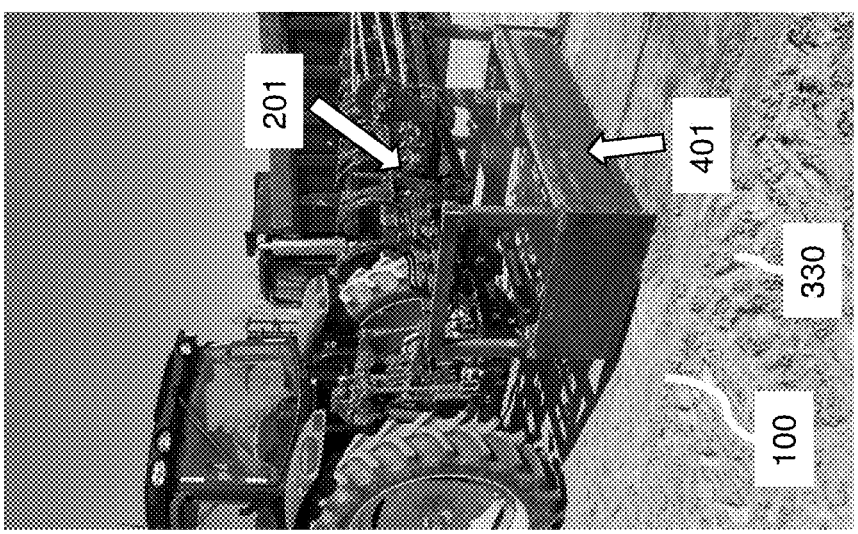

FIG. 3A, FIG. 3B, and FIG. 3C are pictorial views of combination farming implement 100 undergoing a rotation process while attached to a vehicle, in accordance with one embodiment.

Referring now to FIG. 2A through FIG. 2D and FIG. 3A through FIG. 3C together, FIG. 3A depicts combination farming implement 100, attached to a farming vehicle, in the first resting position (such as shown in FIG. 2A), wherein the box scraper 401 is in a downward position, and is in contact with a relatively flat surface, such as ground or soil 330. FIG. 3A further depicts the cultivator 201 in an upward position, not in contact with ground or soil 330. In various embodiments, ground or soil 330 can be any type of surface on which an operator of combination farming implement 100 desires to perform a scraping and/or cultivating function. Examples of such surfaces include, but are not limited to, soil surfaces, dirt surfaces, gravel surfaces, farm field surfaces, lawn surfaces, garden surfaces, parking lot surfaces, arena surfaces, and event grounds surfaces.

FIG. 3B depicts combination farming implement 100, attached to a farming vehicle, during the rotation process, wherein the box scraper 401 has been lifted from ground or soil 330, and combination farming implement 100 is in the process of being rotated approximately 180 degrees (as shown in FIG. 2B and FIG. 2C), such that, after the rotation process, the cultivator 201 will be facing downward and will be able to make contact with ground or soil 330.

In various embodiments, the rotation process can be initiated by a vehicle operator from a remote location, such as, but not limited to, from inside the cab of a tractor, by means of switch, button, lever, or other device under the control of the vehicle operator. As can be seen in FIG. 3B, in the embodiments disclosed herein, the vehicle operator does not need to leave the cab of the vehicle to initiate the rotation process, and the vehicle operator does not need to make physical contact with any element of combination farming implement 100 during use in the field.

FIG. 3C depicts combination farming implement 100, attached to a farming vehicle, in the second resting position, after the rotation process, wherein the cultivator 201 is in a downward position, and is in contact with ground or soil 330 (as shown in FIG. 2D). FIG. 3C further depicts box scraper 401 in an upward position, not in contact with ground or soil 330.

Although the illustrative embodiments shown in the preceding figures depict a clockwise rotation wherein the first resting position includes the box scraper facing downward and further wherein the second resting position includes the cultivator facing downward, it should be noted here that rotating mechanism 301 of the disclosed embodiments also allows for a reverse rotation. For example, in several embodiments, the rotation process may be started while the cultivator is in a downward position, the cultivator may then be lifted, and the combination farming implement 100 may then be rotated counterclockwise approximately 180 degrees, such that, after the rotation process, the box scraper 401 will be facing downward and will be able to be lowered to make contact with the ground or soil.

Further, in various other embodiments, combination farming implement 100 may be configured to allow for different variations of the direction and angle of the rotation. For example, in some embodiments, combination farming implement 100 may be configured to allow for a complete 360 degree rotation in either a clockwise or a counterclockwise direction. The specific details relating to the functioning of rotating mechanism 301, as depicted in the preceding figures, will be discussed in greater detail below.

Figure 4A:
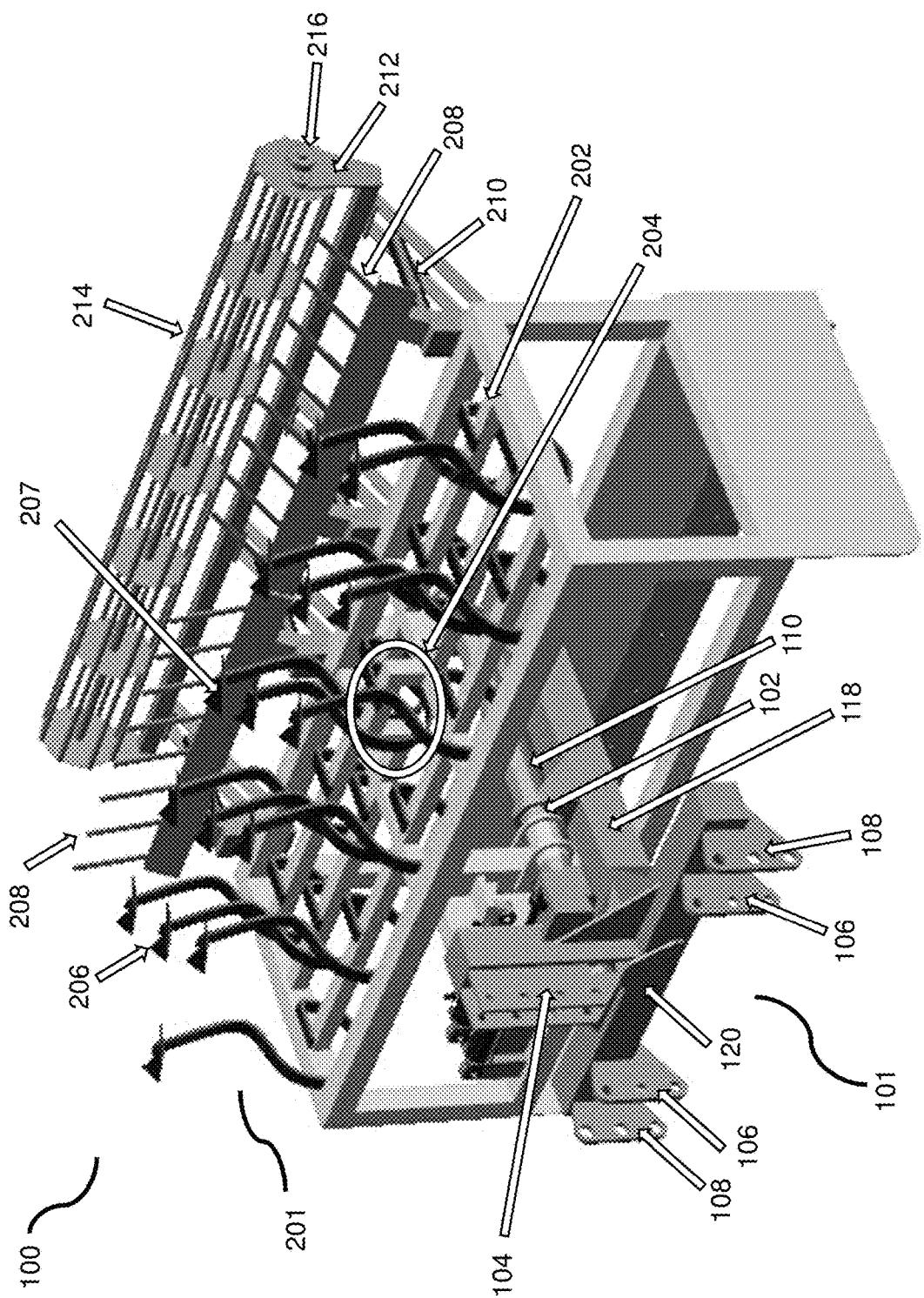
FIG. 4A is an angled overhead view of a combination farming implement, which shows the individual parts of a main frame component and the individual parts of a cultivator component, in accordance with one embodiment.

FIG. 4A is an angled overhead view of combination farming implement 100, which shows the individual parts of main frame component 101 and the individual parts of cultivator component 201, in accordance with one embodiment.

In one embodiment, main frame 101 primarily includes main frame mount assembly 120, upper 3-point mounts 104, lower inner 3-point mounts 106, lower outer 3-point mounts 108, main frame support beam 118, center hinge pipe 102, and center pipe support 110. In the illustrative embodiment depicted in FIG. 4A, upper 3-point mounts 104, lower inner 3-point mounts 106, and lower outer 3-point mounts 108 are industry standard mounts which are specifically sized and positioned to allow combination farming implement 100 to be attached or mounted to different sizes and categories of agricultural vehicles, such that combination farming implement 100 can be operated with proper clearances to avoid hitting the ground during the rotation process. Further, the 3-point mounts disclosed herein are able to be adjusted as needed such that combination farming implement 100 can be properly operated without the need to modify combination farming implement 100 for each specific vehicle. In the various embodiments depicted herein, the above described mount points are specifically designed, positioned, and sized to be attached or mounted to farming vehicles, however in various other embodiments, the mount points may be configured differently to allow combination farming implement 100 to be mounted to other types of vehicles.

As shown in FIG. 4A, in one embodiment, upper 3-point mounts 104, lower inner 3-point mounts 106, and lower outer 3-point mounts 108 are affixed to the main frame mount assembly 120 portion of main frame 101. In one embodiment, main frame 101 further includes main frame support beam 118, which is affixed to the back of main frame mount assembly 120 such that it protrudes backward from main frame mount assembly 120 and extends in a horizontal direction through the width of combination farming implement 100. In one embodiment, center pipe support 110 is affixed to an upper surface of main frame support beam 118. In one embodiment, center hinge pipe 102 passes through center pipe support 110, such that center hinge pipe 102 is held parallel to and above main frame support beam 118. Additional details regarding the functioning of center hinge pipe 102 will be discussed in further detail below. In one embodiment, main frame 101 further includes modified main support gusset 112, which is not shown here in FIG. 4A, but will be shown and discussed in further detail below.

In one embodiment, cultivator 201 includes tool bar 202, tool bar dogleg 204, high clearance shanks 206, center shank 207, right and left tine rakes 208, spring mount assembly 210, bearing mount bar 212, pillow block bearing 216, and rolling harrow basket 214.

In the specific embodiment depicted in FIG. 4A, cultivator 201 includes three primary elements. The first primary element of cultivator 201 is high clearance shanks 206, which are heavy-duty tines that function to work up a surface such as ground or soil, to remove weeds, trash, or other types of debris from the surface. The second primary element of cultivator 201 is left and right tine rakes 208, which, in one embodiment, are positioned behind high clearance shanks 206 such that left and right tine rakes 208 can perform a leveling of the surface after high clearance shanks 206 have performed their function of working up the surface. The third primary element of cultivator 201 is rolling harrow basket 214, which, in one embodiment, is positioned behind left and right tine rakes 208 such that the rolling harrow basket 214 can break up dirt clods to smooth and level the appearance of the surface after the high clearance shanks 206 and left and right tine rakes 208 have performed their respective functions.

In one embodiment, tool bar 202 is affixed to a top side of a rotating framework, which will be discussed in additional detail below. In various embodiments, tool bar 202 consists of a rectangular frame (which in some embodiments is part of the rotating framework) with a plurality of horizontal members that extend across the entire length of the frame. The main purpose of these length-wise members is to provide a plurality of surfaces on which to affix tools, such as, but not limited to, tines, S-tines, shanks, and discs. In some embodiments, the tool bar 202 further includes a plurality of horizontal members that extend across the entire width of the frame. The main purpose of these width-wise members is to reinforce tool bar 202 so that the frame or length-wise members do not get bent during use of combination farming implement 100.

In one embodiment, high clearance shanks 206 are affixed to tool bar 202 of combination farming implement 100, and are positioned such that they are spread out evenly across the various length-wise members of tool bar 202. Further, in one embodiment, tool bar dogleg 204 protrudes upwards from the center of tool bar 202, and center shank 207 is affixed to tool bar dogleg 204. This design is necessary to keep center shank 207 from interfering with the rotation process, as will be discussed in additional detail below. In one embodiment, center shank 207 is a regular clearance shank instead of a high clearance shank.

In one embodiment, left and right tine rakes 208 are affixed to spring mount assembly 210, and spring mount assembly 210 is affixed to a portion of combination farming implement 100. As depicted in FIG. 4A, in some embodiments, spring mount assembly 210 may be affixed to different points along the length of tool bar 202. In other embodiments, spring mount assembly 210 may be affixed to different portions of the rotating framework. In one embodiment, left and right tine rakes 208 are positioned such that the outer left and right tines extend beyond the sides of combination farming implement 100 to enable left and right tine rakes 208 to reach soil or dirt that may be strewn to the left and right of combination farming implement 100 during the cultivation process.

In various embodiments, spring mount assembly 210 functions as a shock absorber to allow left and right tine rakes 208 and rolling harrow basket 214 to flex as needed. Rolling harrow basket 214 is attached to spring mount assembly 210 by means of bearing mount bar 212, which utilizes standard pillow block bearings 216 to secure rolling harrow basket 214 to spring mount assembly 210. The particular design of spring mount assembly 210 and the various methods for connecting left and right tine rakes 208 and rolling harrow basket 214 to spring mount assembly 210 are well known to those of skill in the art, and thus will not be discussed in further detail herein.

Although the specific combination of cultivator elements discussed above is depicted in the accompanying figures, it should be clear to those of skill in the art that many other types of cultivator elements may be used with combination farming implement 100, depending on the needs of the user. For example, in some embodiments, left and right tine rakes 208 and rolling harrow basket 214 may not be present. In other embodiments, different types of tines or shanks may be used in place of or in addition to high clearance shanks 206. For example, in some embodiments, cultivator 201 utilizes Danish S-tines. In still other embodiments, the cultivator 201 may utilize discs in place of tines or shanks.

Figure 4B:
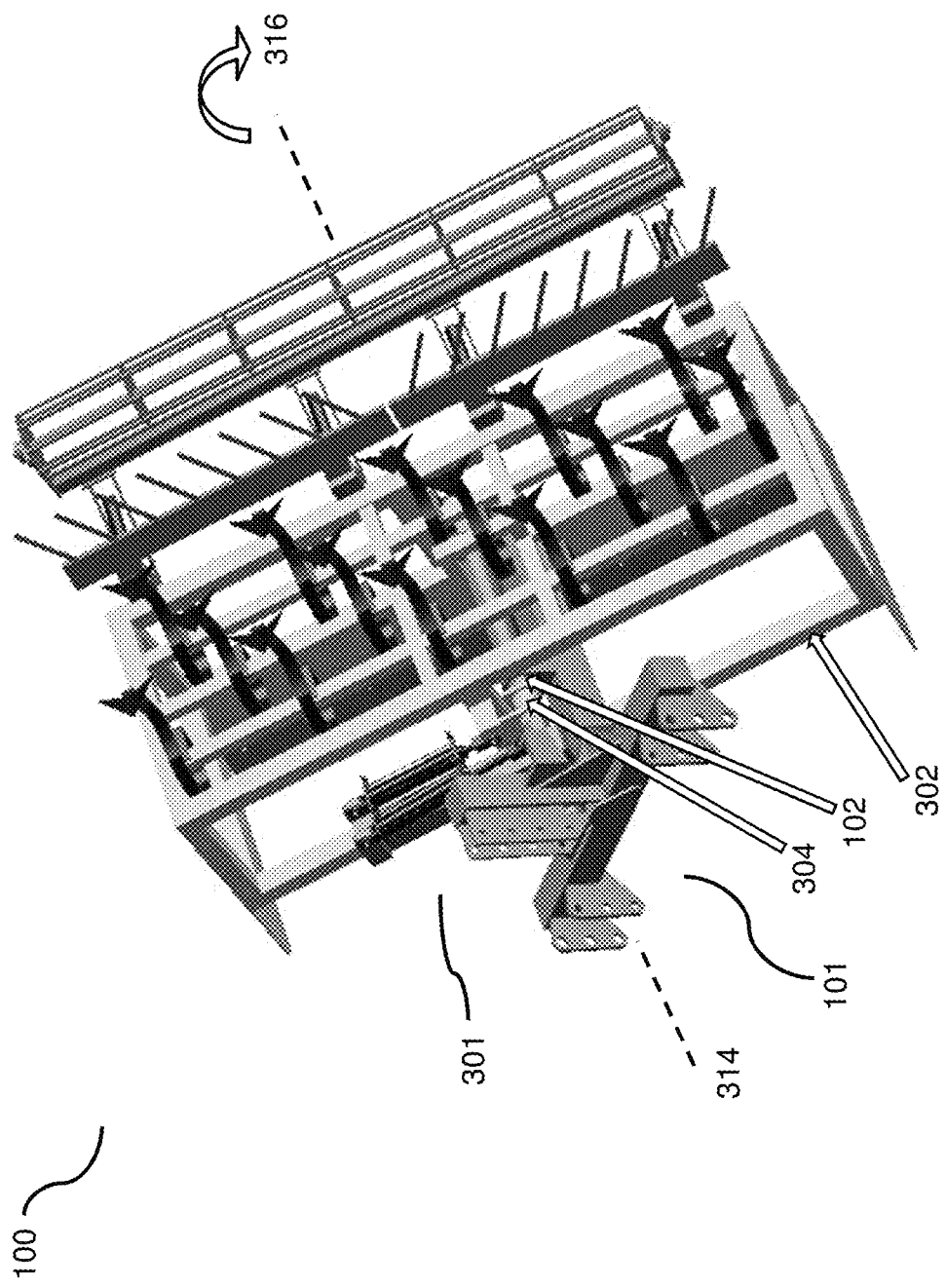
FIG. 4B is an angled overhead view of a combination farming implement undergoing a rotation process, which shows individual parts of a rotating mechanism component, in accordance with one embodiment.

FIG. 4B is an angled overhead view of combination farming implement 100 undergoing a rotation process, which shows individual parts of rotating mechanism 301, in accordance with one embodiment.

In one embodiment, rotating mechanism 301, which is coupled to main frame 101 and rotating framework 302, utilizes framework front hinge 304, and framework rear hinge 306 (not shown) to enable rotation of the combination farming implement 100 about center hinge pipe 102 in direction of rotation 316. Thus, the position of center hinge pipe 102 defines axis of rotation 314 about which combination farming implement 100 rotates. Each of the above elements will be discussed in further detail below.

Figure 4C:
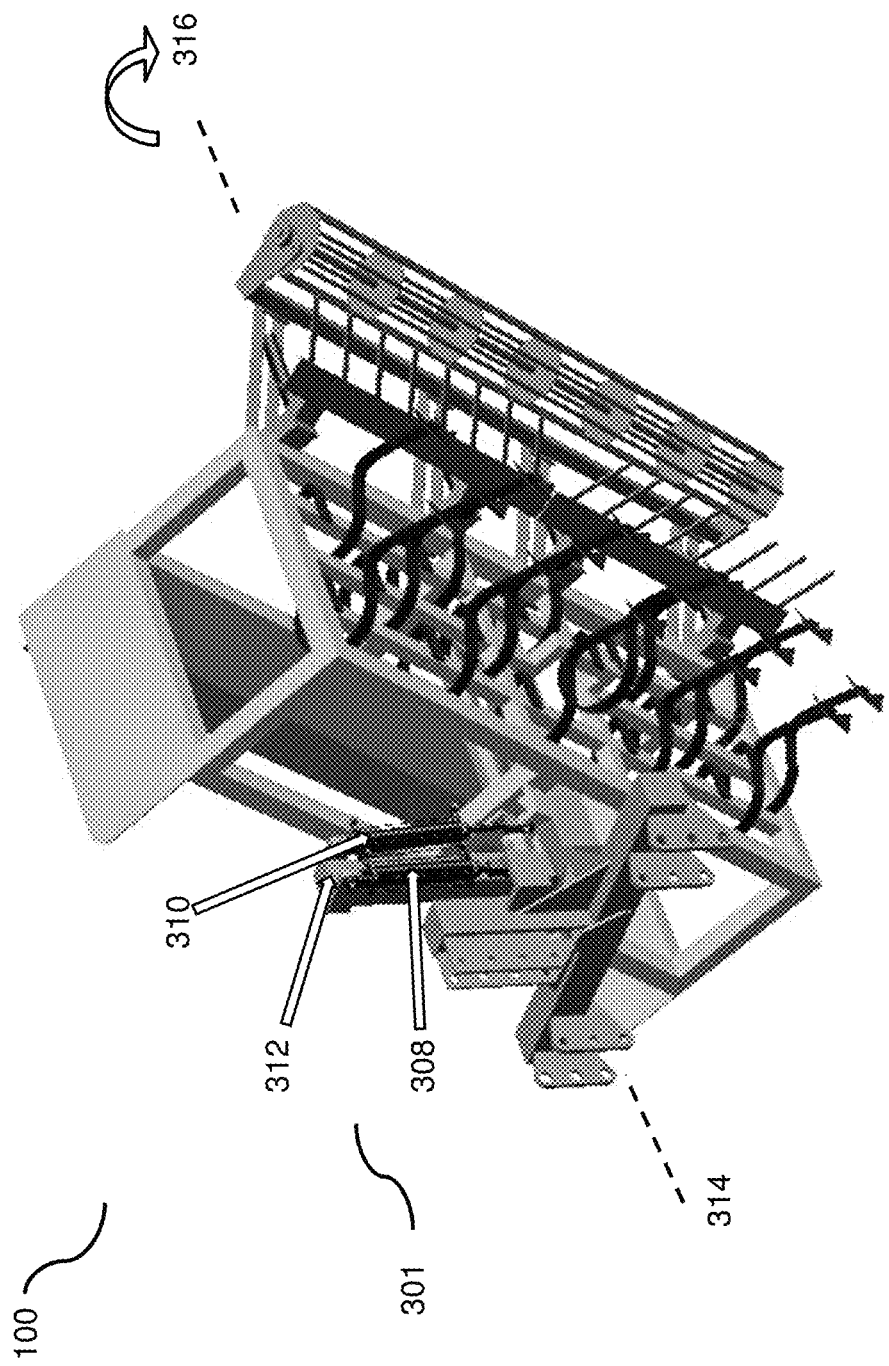
FIG. 4C is an angled overhead view of a combination farming implement undergoing a rotation process, which shows additional individual parts of a rotating mechanism component, in accordance with one embodiment.

FIG. 4C is an angled overhead view of combination farming implement 100 undergoing a rotation process, which shows additional individual parts of rotating mechanism 301, in accordance with one embodiment.

As shown in the illustrative embodiment of FIG. 4C, rotating mechanism 301 further includes outer hydraulic ram 308, inner hydraulic ram 310, and modified hydraulic ram pivot arm 312. Each of these elements will be discussed in further detail below.

Figure 4D:
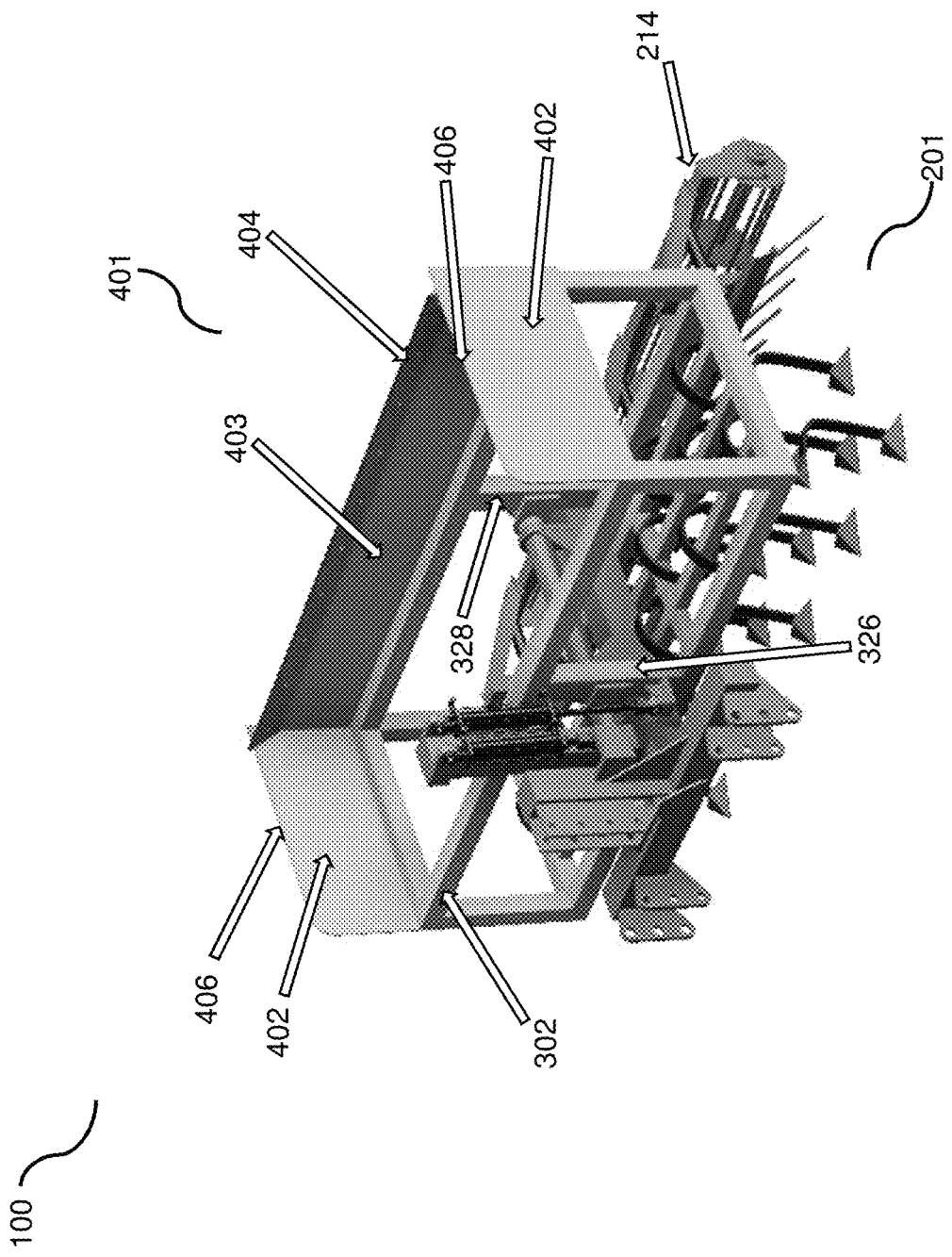
FIG. 4D is an angled overhead view of a combination farming implement having completed a rotation process, which shows further detail of a rotating framework, as well as the individual parts of a box scraper component, in accordance with one embodiment.

FIG. 4D is an angled overhead view of combination farming implement 100 having completed a rotation process, which shows further detail of rotating framework 302, as well as each of the individual parts of box scraper component 401, in accordance with one embodiment. As discussed above, in one embodiment, box scraper 401 performs the function of leveling and smoothing out a surface such as ground or soil, for example, to fill in ruts that may have been created by vehicles or other equipment during field maintenance operations.

As shown in the illustrative embodiment of FIG. 4D, in one embodiment, rotating framework 302 is a box framework with four corner vertical members and two central vertical members. Of specific importance are front central vertical member 326 and rear central vertical member 328, which will be discussed in further detail below. One end of each of the corner and central vertical members is connected perpendicularly to a horizontally positioned portion of a first rectangular frame, and the other end of each of the vertical members is connected perpendicularly to a horizontally positioned portion of a second rectangular frame. Thus, the rotating framework 302 is in the shape of a rectangular box, having a first frame and a second frame which correspond to opposite sides of the box shape. In the specific illustrative embodiment of FIG. 4D, the first frame of rotating framework 302 is facing upward, and serves as a mount point for the various components of box scraper 401, and the second frame of rotating framework 302 is facing downward, and serves as a mount point for various components of cultivator 201.

In various embodiments, box scraper 401, which is shown in FIG. 4D in an upward position, includes box scraper side panels 402 and box scraper rear panel 403, each of which has a respective box scraper bladed end 406. In one embodiment, box scraper side panels 402 are each affixed to opposing sides of a first frame of rotating framework 302 such that box scraper side panels 402 are parallel with and facing each other. Further, in one embodiment, box scraper rear panel 403 is affixed to a first frame of rotating framework 302 such that it is perpendicular to box scraper side panels 402. Additionally, in one embodiment, box scraper rear panel 403 is affixed to the rear side of rotating framework 302, i.e., the side of rotating framework 302 that is closest to rolling harrow basket 214. In the illustrative embodiment of FIG. 4D, when cultivator 201 is in a downward position, the box scraper bladed ends 406 of box scraper side panels 402 and box scraper rear panel 403 are facing upwards, and are all positioned at relatively level heights with respect to one another.

In the specific embodiment shown in FIG. 4D, box scraper 401 further includes reversible cutting edge 404, which is affixed to the box scraper bladed end 406 of box scraper rear panel 403 such that it is parallel with box scraper rear panel 403. In one embodiment, reversible cutting edge 404 extends the entire length of box scraper rear panel 403, and somewhat past the height of box scraper side panels 402 and box scraper rear panel 403, such that when box scraper 401 is in a downward position, reversible cutting edge 404 is able to make solid contact with a surface such as ground or soil. In some embodiments, reversible cutting edge 404 is affixed to box scraper rear panel 403 such that it may be removed and replaced as needed during equipment maintenance.

Although the figures as shown and described above depict a specific design for combination farming implement 100 that includes a box scraper, those of skill in the art will readily recognize that any type of scraping implement may be used with combination farming implement 100, and the embodiments disclosed herein should not be construed as limiting the invention to any one particular kind of scraper. Examples of other types of scraping implements that may be used include, but are not limited to, single blade scrapers, angled blade scrapers, land levelers, and/or any other scraping implements that may be currently known or developed after filing. Further, the specific positions, orientations, and sizes of the scraper components are not limited to those depicted and described in the illustrative embodiment of FIG. 4D. One of skill in the art will recognize that any combination of scraper elements may be positioned, orientated, and sized in a wide variety of configurations to suit the needs of a user of combination farming implement 100.

FIG. 5A, FIG. 5B, FIG. 5C, FIG. 5D, and FIG. 5E are detail views of rotating mechanism 301 undergoing various stages of a rotation process, in accordance with one embodiment.

Referring now to FIG. 5A through FIG. 5E and FIG. 4A together, in FIG. 5A through FIG. 5E, portions of main frame 101 shown in FIG. 4A, such as the main frame mount assembly 120 and the main frame support beam 118, have been hidden from view to more clearly show the parts and operation of rotating mechanism 301.

FIG. 5A is an angled overhead view of rotating mechanism 301 of combination farming implement 100, in accordance with one embodiment, which shows box scraper 401 in a downward position and rotating mechanism 301 in a first resting position. In various embodiments, the first resting position includes box scraper 401 being in contact with or parallel to a relatively flat surface, such as ground or soil. As can be seen in the illustrative embodiment of FIG. 5A, in the first resting position, outer hydraulic ram 308, inner hydraulic ram 310, and modified hydraulic ram pivot arm 312 are positioned such that they are relatively parallel to the longer sides of the frames that make up rotating framework 302, which are shown in FIG. 5A in a horizontal position.

In one embodiment, modified hydraulic ram pivot arm 312 is coupled to main frame 101 (shown in FIG. 4A) by means of center hinge pipe 102, which runs through a lower end of modified hydraulic ram pivot arm 312. Center hinge pipe 102 also runs through framework front hinge 304, which in one embodiment is affixed to front central vertical member 326. Further, center hinge pipe 102 also runs through center pipe support 110 (shown in FIG. 5D) and through or into framework rear hinge 306 (shown in FIG. 5D). This combination of elements allows the combination farming implement to rotate about center hinge pipe 102. In various embodiments, outer hydraulic ram 308 is affixed to modified hydraulic ram pivot arm 312 at upper outer ram mount point 318 and is affixed to main frame 101 (shown in FIG. 4A through 4D) at lower outer ram mount point 320. Inner hydraulic ram 310 is affixed to modified hydraulic ram pivot arm 312 at upper inner ram mount point 322 and is also affixed to rotating framework 302 at lower inner ram mount point 324. In one embodiment, lower inner ram mount point 324 is a part of rotating framework 302 that is affixed to and protrudes outward from front central vertical member 326 of rotating framework 302.

FIG. 5B is an angled overhead view of rotating mechanism 301 of combination farming implement 100, in accordance with one embodiment, which shows combination farming implement 100 at one possible stage during a rotation process, rotated approximately 45 degrees clockwise from the first resting position shown in FIG. 5A. In one embodiment, at this stage of rotation, outer hydraulic ram 308 has begun retracting towards lower outer ram mount point 320, which has the effect of pulling modified hydraulic ram pivot arm 312 upwards. At the rotation stage shown in FIG. 5B, combination farming implement 100 has been rotated approximately 45 degrees clockwise about center hinge pipe 102. Further, modified hydraulic ram pivot arm 312 has also been rotated, along with outer hydraulic ram 308 and inner hydraulic ram 310, such that they remain positioned relatively parallel to the longer sides of the frames that make up rotating framework 302.

FIG. 5C is an angled overhead view of rotating mechanism 301 of combination farming implement 100, in accordance with one embodiment, which shows combination farming implement 100 at another possible stage during a rotation process, rotated approximately 90 degrees clockwise from the first resting position shown in FIG. 5A. In one embodiment, at this stage of rotation, outer hydraulic ram 308 has been fully retracted towards lower outer ram mount point 320, such that modified hydraulic ram pivot arm 312 has been pulled upwards and is now perpendicular to main frame 101 (shown in FIG. 4A). At the rotation stage shown in FIG. 5C, combination farming implement 100 has been rotated approximately 90 degrees about center hinge pipe 102. Further, modified hydraulic ram pivot arm 312 has also been rotated, along with outer hydraulic ram 308 and inner hydraulic ram 310, such that they remain positioned relatively parallel to the longer sides of the frames that make up rotating framework 302, which are shown in 5C in a vertical position.

FIG. 5D is an angled overhead view of rotating mechanism 301 of combination farming implement 100, in accordance with one embodiment, which shows combination farming implement 100 at another possible stage during a rotation process, rotated approximately 135 degrees clockwise from the first resting position shown in FIG. 5A. In one embodiment, at this stage of rotation, inner hydraulic ram 310 has begun extending away from lower inner ram mount point 324, thus exerting a downward force on lower inner ram mount point 324 to achieve further rotation of rotating framework 302. At the rotation stage shown in FIG. 5D, combination farming implement 100 has been rotated approximately 135 degrees about center hinge pipe 102. Center hinge pipe 102 can be seen here in FIG. 5D as running through a lower end of modified hydraulic ram pivot arm 312, framework front hinge 304, center pipe support 110, and through or into framework rear hinge 306. In one embodiment, framework rear hinge 306 is affixed to rear central vertical member 328 of rotating framework 302. At this stage of the rotation process, modified hydraulic ram pivot arm 312 remains in a fixed position, along with outer hydraulic ram 308 and inner hydraulic ram 310, such that they are no longer parallel to the longer sides of the frames that make up rotating framework 302.

FIG. 5E is an angled overhead view of rotating mechanism 301 of combination farming implement 100, in accordance with one embodiment, which shows cultivator 201 in a downward position, and rotating mechanism 301 in a second resting position. In one embodiment, in the second resting position, combination farming implement 100 has been rotated approximately 180 degrees from the first resting position shown in FIG. 5A. At this stage of rotation, inner hydraulic ram 310 has been fully extended away from lower inner ram mount point 324 to achieve the full 180 degrees of rotation. Further, in one embodiment, modified hydraulic ram pivot arm 312 remains in its previous fixed position, along with outer hydraulic ram 308 and inner hydraulic ram 310, such that they are now positioned orthogonally to the longer sides of the frames that make up rotating framework 302, which are again shown in 5E in a horizontal position. Thus, the combination of the retraction of outer hydraulic ram 308 and the extension of inner hydraulic ram 110 results in a 180 degree rotation of combination farming implement 100.

As noted above, although the illustrative embodiments shown in the preceding figures depict a clockwise rotation wherein the first resting position includes the box scraper facing downward and further wherein the second resting position includes the cultivator facing downward, it should be noted here that rotating mechanism 301 of the disclosed embodiments also allows for a reverse rotation. For example, in several embodiments, the rotation process may be started while the cultivator is in a downward position and the combination farming implement 100 may then be rotated counterclockwise approximately 180 degrees, such that, after the rotation process, the box scraper 401 will be facing downward. Further, in various other embodiments, combination farming implement 100 may be configured to allow for different variations of the direction and angle of the rotation. For example, in some embodiments, combination farming implement 100 may be configured to allow for a complete 360 degree rotation in either a clockwise or a counterclockwise direction.

Further, although the specific illustrative embodiments discussed herein achieve rotation through use of dual hydraulic arms, in other embodiments, different mechanisms may be utilized to perform rotation and still fall within the scope of this disclosure. For example, in some embodiments, rotation may be performed by utilizing a sprocket and a hydraulic motor, or any other rotational mechanisms currently known to those of skill in the art, or as may be developed after filing.

Several unanticipated problems were encountered by the inventor during the testing of this invention. For instance, in designing rotating mechanism 301, the inventor needed to determine the minimum and maximum limits of outer hydraulic ram 308 and inner hydraulic ram 310, as well as making several modifications to the length of modified hydraulic ram pivot arm 312 in relation to the ram mount points 318, 320, 322, and 324. These steps were taken to determine central locations for the ram mount points 318, 320, 322, and 324, to allow outer hydraulic ram 308 and inner hydraulic ram 310 to be at their maximum and minimum limits when rotating framework 302 is in either of the operating positions, e.g., when the rotating framework 302 is in the first resting position with box scraper 401 facing downward, or when rotating framework 302 is in the second resting position with cultivator 201 facing downward. These modifications were necessary to prevent operator error, for example, wherein the combination farming implement 100 could be damaged if the operator does not release controls of combination farming implement 100 at the appropriate time.

Referring now to FIG. 6A through FIG. 6D, FIG. 4A through FIG. 4D, and FIG. 5A through 5E together, FIG. 6A through FIG. 6D provide additional perspectives of several of the individual parts of combination farming implement 100, which were described in detail above in the above discussion of FIG. 4A through FIG. 4D and FIG. 5A through FIG. 5E.

Figure 6A:
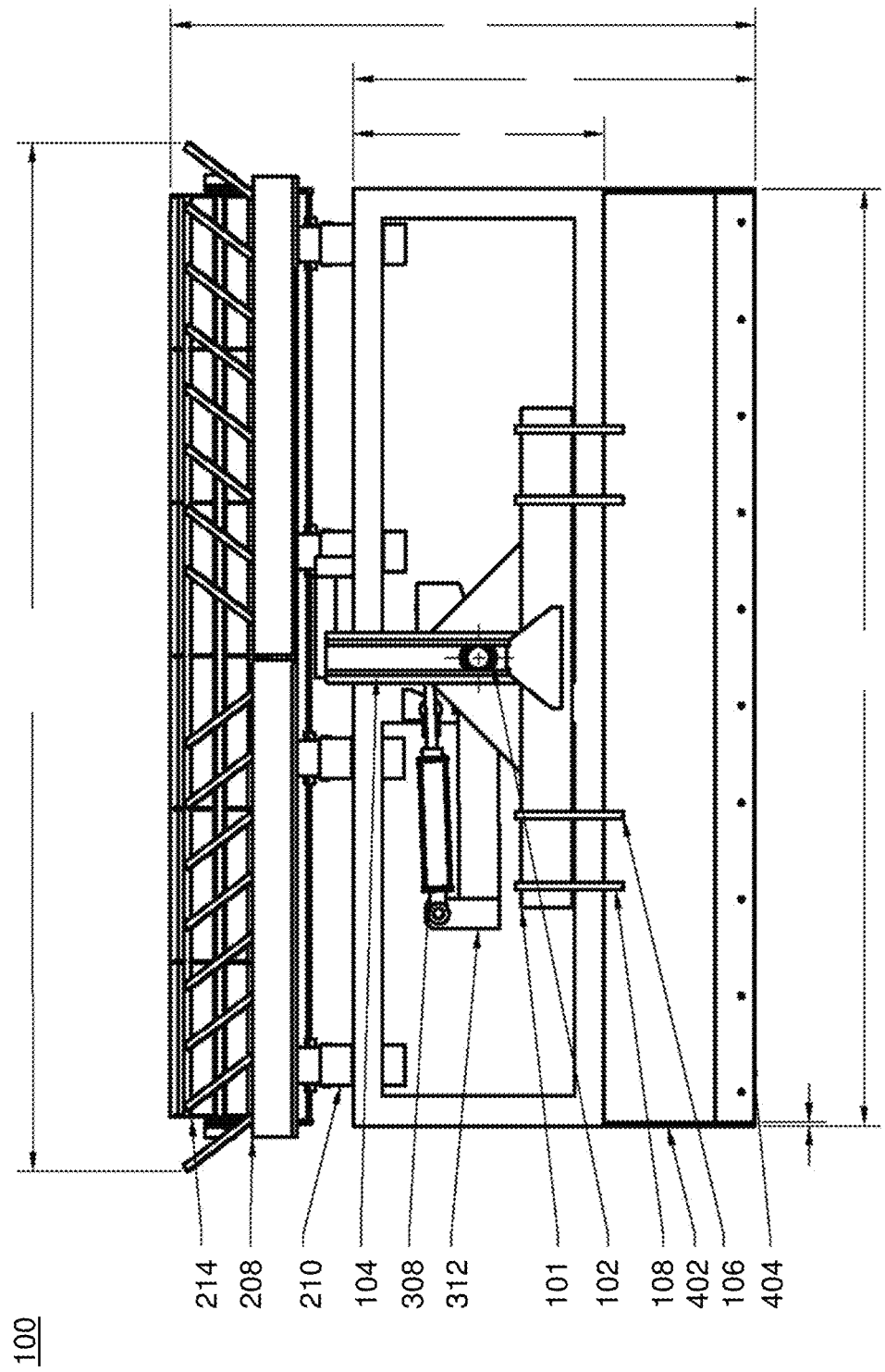
FIG. 6A is a front view line drawing of a combination farming implement, in accordance with one embodiment.

FIG. 6A is a front view line drawing of combination farming implement 100, in accordance with one embodiment.

Referring specifically to FIG. 6A, FIG. 4A through FIG. 4D, and FIG. 5A through FIG. 5E together, the front view of combination farming implement 100 depicted in FIG. 6A provides an additional perspective of one embodiment of combination farming implement 100 from a point of view that faces the distal ends of upper 3-point mounts 104, lower inner 3-point mounts 106, and lower outer 3-point mounts 108. FIG. 6A further shows an additional perspective of main frame 101, center hinge pipe 102, rolling harrow basket 214, right and left tine rakes 208, and spring mount assembly 210. Each of above-listed elements is also shown in FIG. 4A. FIG. 6A also shows an additional perspective of outer hydraulic ram 308 and modified hydraulic ram pivot arm 312 (as also shown in FIG. 4C and FIG. 5A through FIG. 5E), as well as box scraper side panels 402, and reversible cutting edge 404 (as also shown in FIG. 4D).

Figure 6B:
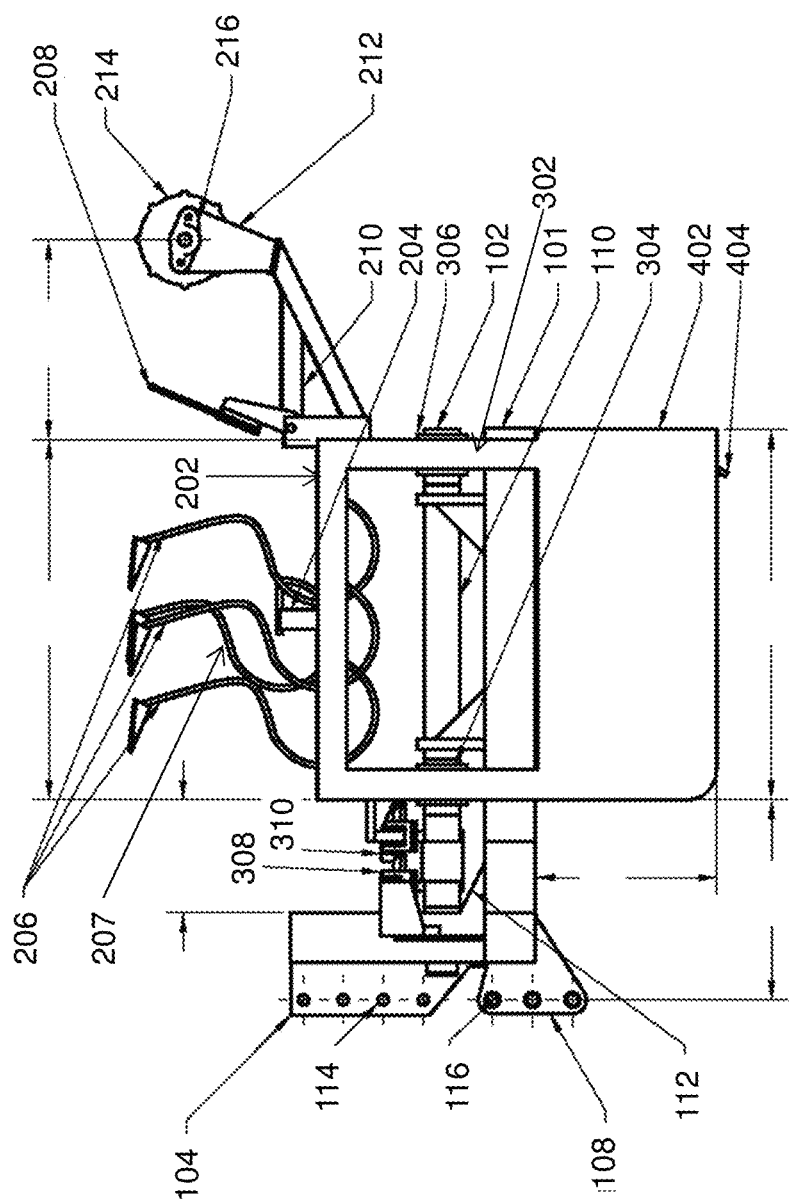
FIG. 6B is a right side view line drawing of a combination farming implement, in accordance with one embodiment.

FIG. 6B is a right side view line drawing of combination farming implement 100, in accordance with one embodiment.

Referring specifically to FIG. 6B, FIG. 4A, and FIG. 4B together, the right side view of combination farming implement 100 depicted in FIG. 6B provides an additional perspective of the individual parts of main frame 101, such as center hinge pipe 102, center pipe support 110, upper 3-point mount 104, and lower outer 3-point mount 108 (as also shown in FIG. 4A). The perspective shown in FIG. 6B further includes a clear view of additional parts of main frame 101 not discussed above, such as modified main support gusset 112, upper mount holes 114, and lower mount holes 116.

In various embodiments, upper mount holes 114 and lower mount holes 116 are sized such that upper 3-point mount 104, lower inner 3-point mount 106, and lower outer inner 3-point mount 108 can accommodate hitching pins of a variety of sizes. As discussed above, the sizing and position of the upper mount hoes 114 and lower mount holes 116 allows combination farming implement 100 to be attached to all or most standard categories and sizes of agricultural vehicles.

Several unanticipated problems were encountered by the inventor during the testing of this invention. For instance, as discovered by the inventor, in order for combination farming implement 100 to be used effectively with a variety of categories and sizes of vehicles, rotating framework 302 (as also shown in FIG. 4B) must be made small enough to maximize ground clearance of combination farming implement 100 during the rotation process. In the embodiments disclosed herein, in order to reduce the size of rotating framework 302, modified main support gusset 112 is specifically designed to be long enough to support the weight of the machinery, but also as short as possible to achieve the smallest gap between main frame 101 and center hinge pipe 102. In one embodiment, rotating framework 302 is constructed such that it barely clears the bottom of main frame 101 in order to achieve the necessary height requirements.

Additionally, the right side view of combination farming implement 100 depicted in FIG. 6B provides an additional perspective of the individual parts of cultivator 201, such as high clearance shanks 206, center shank 207, tool bar dog leg 204, right and left tine rakes 208, rolling harrow basket 214, bearing mount bar 212, pillow block bearing 216, and spring mount assembly 210 (as also shown in FIG. 4A).

Referring specifically to FIG. 6B, FIG. 4C, and FIG. 4D together, as also discovered by the inventor, due to the proximity of tool bar 202 to the bottom of main frame 101 during the rotation process (for example, at a point in the rotation process best depicted in FIG. 4C and FIG. 4D), without toolbar dogleg 204, the curved portion of center shank 207 would collide with main frame 101 during the rotation process. Thus, as can be seen in FIG. 6B, in one embodiment, tool bar dogleg 204 protrudes upward from tool bar 202, which allows a regular clearance shank to be used in place of a high clearance shank for center shank 207. This configuration raises the curved portion of center shank 207 to ensure that it is out of the way and thus will not collide with main frame 101 during the rotation process.

Referring specifically to FIG. 6B, FIG. 5A, and FIG. 5D together, the right side view of combination farming implement 100 depicted in FIG. 6B also provides an additional perspective of the individual parts of rotating mechanism 301 discussed above, in accordance with one embodiment, such as rotating framework 302, outer hydraulic ram 308, inner hydraulic ram 310, framework front hinge 304 (as also shown in FIG. 5A), and framework rear hinge 306 (as also shown in FIG. 5D).

Lastly, referring specifically to FIG. 6B and FIG. 4D together, the right side view of combination farming implement 100 depicted in FIG. 6B provides an additional perspective of the individual parts of box scraper 401 discussed above, in accordance with one embodiment, such as box scraper side panels 402 and reversible cutting edge 404 (as also shown in FIG. 4D).

Figure 6C:
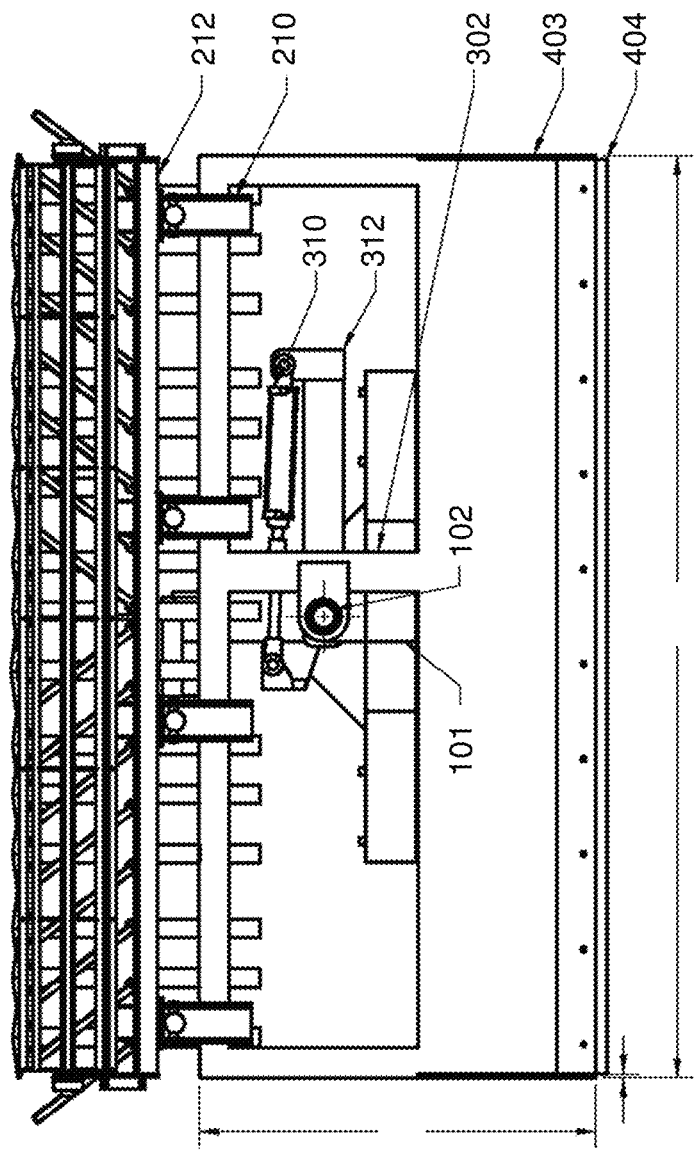
FIG. 6C is a back view line drawing of a combination farming implement, in accordance with one embodiment.

FIG. 6C is a back view line drawing of combination farming implement 100, in accordance with one embodiment.

Referring specifically to FIG. 6C, FIG. 4A through FIG. 4D, and FIG. 5A through FIG. 5E together, the back view of combined farming implement 100 depicted in FIG. 6C provides an additional perspective of individual parts of main frame 101, such as center hinge pipe 102 (as also shown in FIG. 4A). Additionally, the back view of combination farming implement 100 depicted in FIG. 6C provides an additional perspective of the individual parts of cultivator 201, such as bearing mount bar 212 and spring mount assembly 210 (as also shown in FIG. 4A). Further, the back view of combination farming implement 100 depicted in FIG. 6C provides an additional perspective of the individual parts of rotating mechanism 301, such as rotating framework 302, inner hydraulic ram 310, and modified hydraulic ram pivot arm 312 (also shown in FIG. 4B, FIG. 4C, and FIG. 5A through FIG. 5E). Lastly, the back view of combination farming implement 100 depicted in FIG. 6C provides an additional perspective of the individual parts of box scraper 401, such as box scraper rear panel 403 and reversible cutting edge 404 (as also shown in FIG. 4D).

Figure 6D:
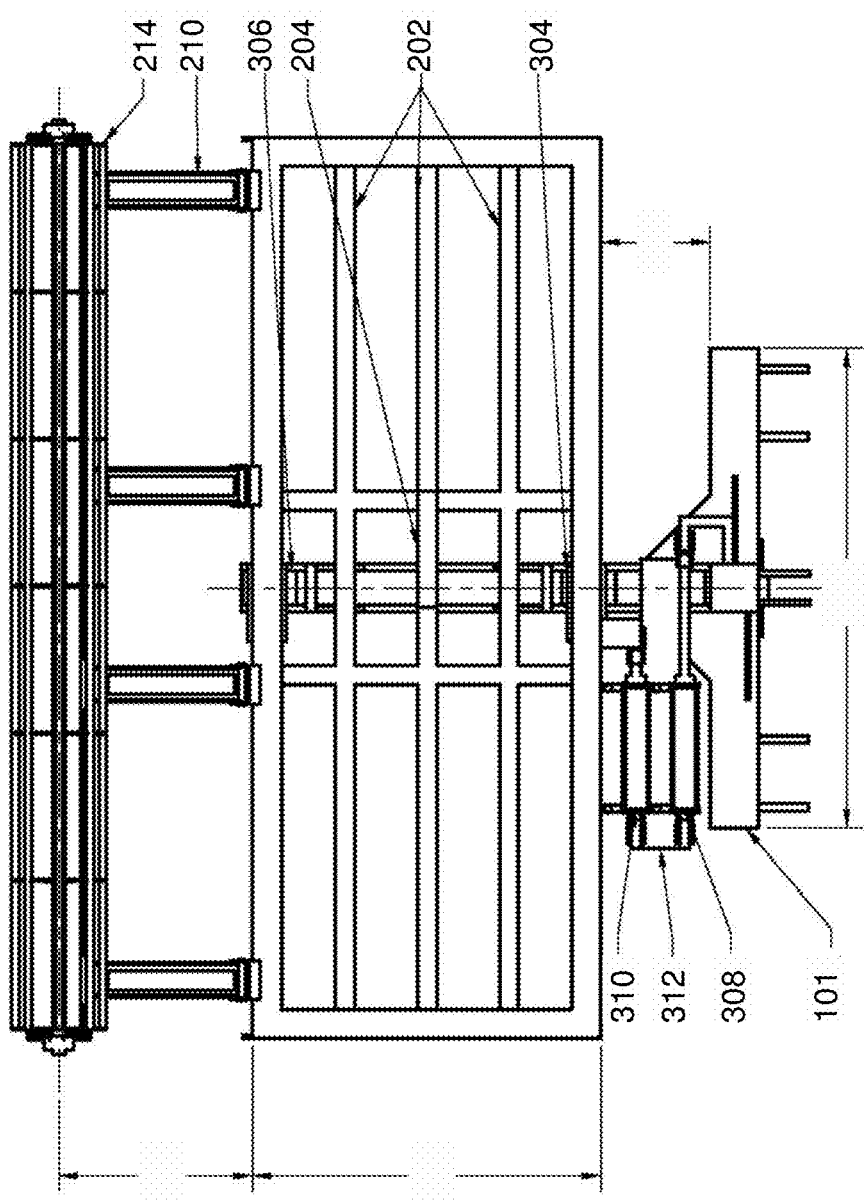
FIG. 6D is a top view line drawing of a combination farming implement, in accordance with one embodiment.

FIG. 6D is a top view line drawing of a combination farming implement, in accordance with one embodiment.

Referring specifically to FIG. 6D, FIG. 4A through FIG. 4D, and FIG. 5A through FIG. 5E together, the top view of combination farming implement 100 depicted in FIG. 6D provides an additional perspective of main frame 101, as well as individual parts of cultivator 201, such as rolling harrow basket 214, spring mount assembly 210, tool bar 202, and tool bar dogleg 204 (as also shown in FIG. 4A). Further, the top view of combination farming implement 100 depicted in FIG. 6D provides an additional perspective of some of the individual parts of rotating mechanism 301, such as framework front hinge 304, outer hydraulic ram 308, inner hydraulic ram 310, and modified hydraulic ram pivot arm 312 (as also shown in FIG. 4C, and FIG. 5A through FIG. 5E), as well as framework rear hinge (as also shown in FIG. 5D).

Figure 7A:
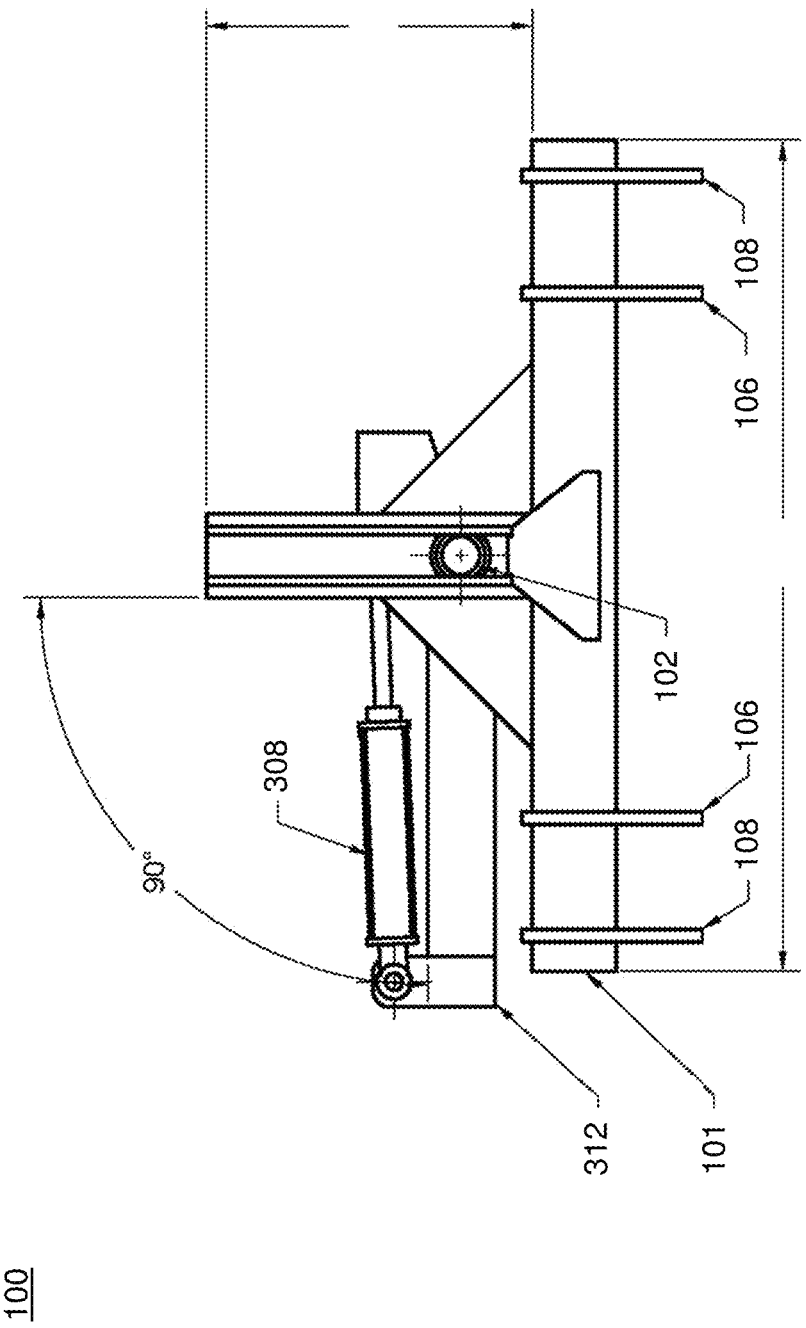
FIG. 7A is a front view line drawing of a main frame component of a combination farming implement, in accordance with one embodiment.

FIG. 7A is a front view line drawing of main frame 101 of combination farming implement 100, in accordance with one embodiment.

Referring specifically to FIG. 7A, FIG. 4A, FIG. 4C, and FIG. 5A through FIG. 5E together, the front view of main frame 101 depicted in FIG. 7A provides an additional perspective of main frame 101, as well as individual parts of main frame 101, such as center hinge pipe 102, lower inner 3-point mounts 106, and lower outer 3-point mounts 108 (as also shown in FIG. 4A). Further, the front view of main frame 101 depicted in FIG. 7A provides an additional perspective of individual parts of rotating mechanism 301, such as outer hydraulic ram 308 and modified hydraulic ram pivot arm 312 (as also shown in FIG. 4C and FIG. 5A through FIG. 5E).

Figure 7B:
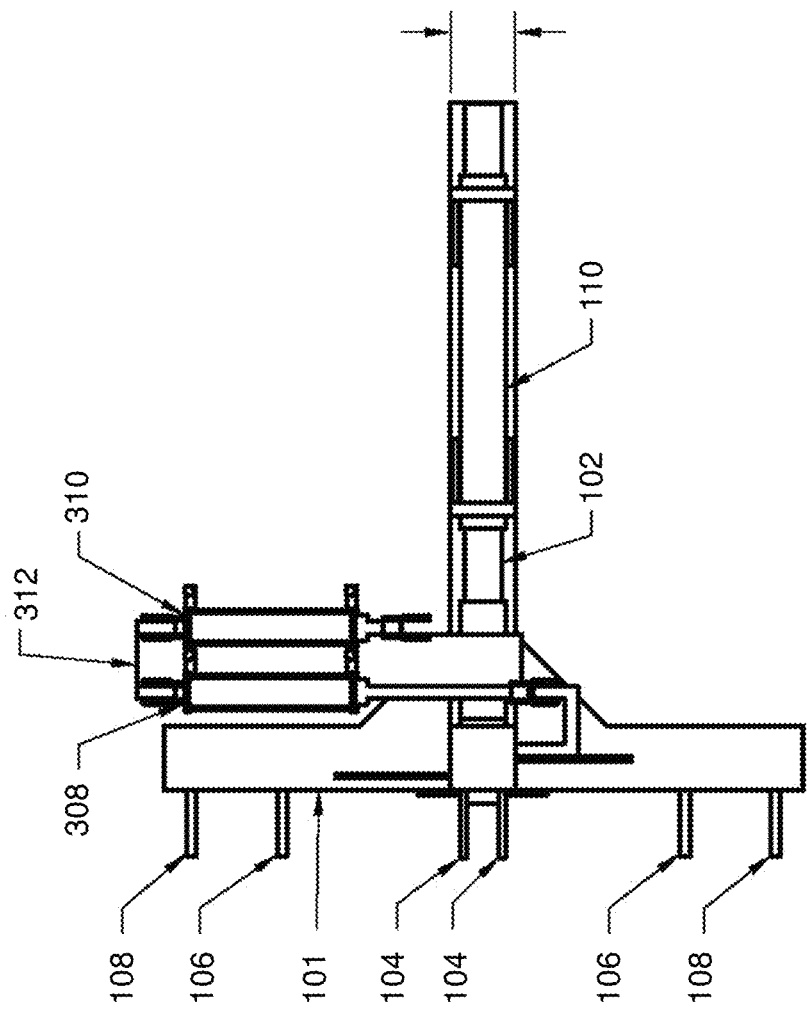
FIG. 7B is a top view line drawing of a main frame component of a combination farming implement, in accordance with one embodiment.

FIG. 7B is a top view line drawing of main frame 101 of combination farming implement 100, in accordance with one embodiment.

Referring specifically to FIG. 7B, FIG. 4A, FIG. 4C and FIG. 5A through FIG. 5E together, the top view of main frame 101 depicted in FIG. 7B provides an additional perspective of main frame 101, as well as individual parts of main frame 101, such as center hinge pipe 102, center pipe support 110, upper 3-point mounts 104, lower inner 3-point mounts 106, and lower outer 3-point mounts 108 (as also shown in FIG. 4A). Further, the top view of main frame 101 depicted in FIG. 7B provides an additional perspective of individual parts of rotating mechanism 301, such as outer hydraulic ram 308, inner hydraulic ram 310, and modified hydraulic ram pivot arm 312 (as also shown in FIG. 4C and FIG. 5A through FIG. 5E).

Figure 7C:
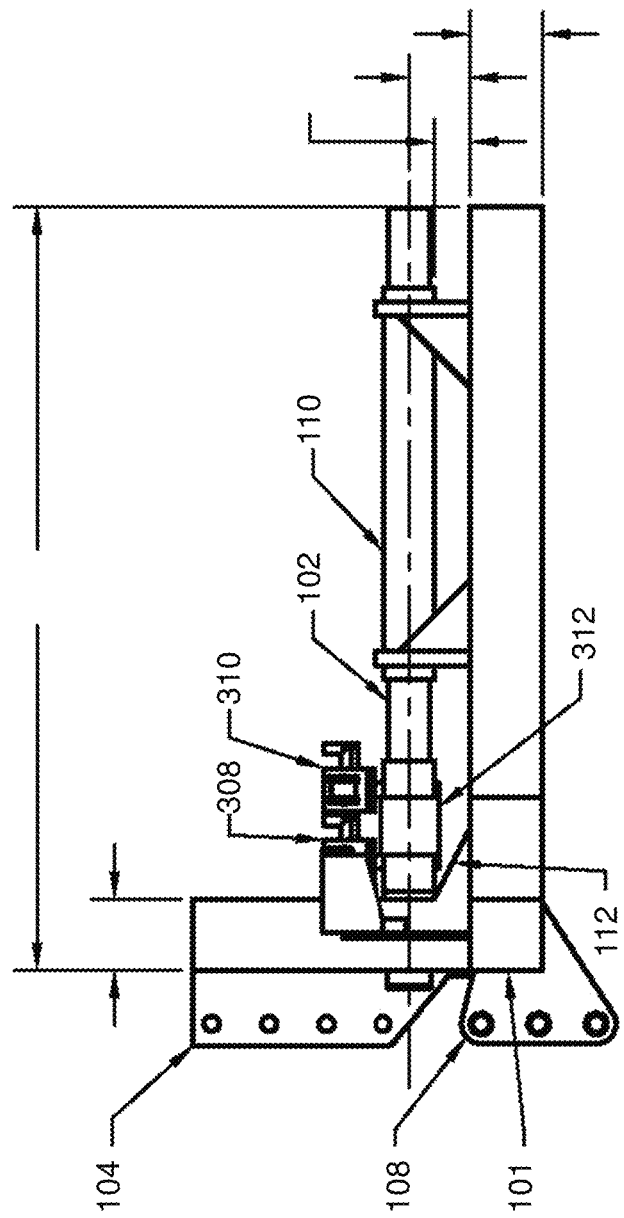
FIG. 7C is a right side view line drawing of a main frame component of a combination farming implement, in accordance with one embodiment.

FIG. 7C is a right side view line drawing of main frame 101 of combination farming implement 100, in accordance with one embodiment.

Referring specifically to FIG. 7C, FIG. 4A, FIG. 4C and FIG. 5A through FIG. 5E together, the right side view of main frame 101 depicted in FIG. 7C provides an additional perspective of main frame 101, as well as individual parts of main frame 101, such as center hinge pipe 102, center pipe support 110, upper 3-point mounts 104, and lower outer 3-point mounts 108 (as also shown in FIG. 4A), as well as modified main support gusset 112. Further, the right side view of main frame 101 depicted in FIG. 7C provides an additional perspective of individual parts of rotating mechanism 301, such as outer hydraulic ram 308 and inner hydraulic ram 310 (as also shown in FIG. 4C, and FIG. 5A through FIG. 5E).

As discussed in detail above, in the embodiments disclosed herein, a cultivator function is coupled with a scraper function, such that the cultivator portion and the scraper portion of the combination farming implement, when attached to a vehicle, can be mechanically and remotely changed out at any time. In one embodiment, this is performed without a vehicle operator ever leaving the vehicle. Consequently, using the disclosed embodiments, the cultivator and scraper functions can be performed by a single implement without the need to transport, attach, detach, store, or maintain separate implements.

In various embodiments, the combination farming implement may be used on farms and fields, however, the disclosed embodiments can also be used on other surfaces, such as, but not limited to, arenas, parking lots, event grounds, such as fair grounds, and virtually any surface where a uniform and groomed surface is desired. As noted above, the grooming of each of these surfaces currently requires two separate implements and therefore the process suffers from significant inefficiencies. However, using the embodiments disclosed herein these inefficiencies can be avoided.

In one specific embodiment, the cultivator portion and the scraper portion of the combination farming implement are positioned on opposite sides of a rotating framework, such that the combination farming implement can be mechanically and remotely rotated during use in the field, thus enabling the performance of both the cultivator function and the scraper function without a vehicle operator ever leaving the vehicle.

In one embodiment, the combination farming implement comprises a rotating framework, a rotational mechanism, a cultivator, and a scraper. In one embodiment, the cultivator and the scraper are attached to opposite sides of the rotating framework such that when an operational portion of the cultivator is positioned for performing a cultivation function on a surface, an operational portion of the scraper is positioned 180 degrees from the operational portion of the cultivator with the operational portion of the scraper facing away from the surface. In one embodiment, upon activation of the rotational mechanism, the rotating framework, the cultivator, and the scraper are rotated 180 degrees about a central axis of the rotating framework such that, after completion of the 180 degree rotation, the operational portion of the scraper is positioned for performing a scraping function on a surface and the operational portion of the cultivator is positioned 180 degrees from the operational portion of the scraper with the operational portion of the cultivator facing away from the surface.

In one embodiment, the cultivator of the combination farming implement includes one or more of shanks, tines, S-tines, discs, tine rakes, and a harrow basket. In one embodiment, the scraper of the combination farming implement is selected from the group of scraper components containing box scrapers, blade scrapers, angled blade scrapers, and land levelers.

In one embodiment, the rotational mechanism of the combination farming implement is a mechanical rotational mechanism. In one embodiment, the rotational mechanism of the combination farming implement is a pneumatic rotational mechanism. In one embodiment, the rotational mechanism of the combination farming implement is a hydraulic rotational mechanism. In one embodiment the hydraulic rotational mechanism further includes one or more hydraulic rams.

In one embodiment, the combination farming implement further comprises a main frame including a center hinge pipe, wherein the rotating framework is rotatably coupled to the center hinge pipe such that, upon activation of the rotational mechanism, the rotating framework, the cultivator, and the scraper are rotated 180 degrees about the central hinge pipe. In one embodiment, the main frame of the combination farming implement further includes a mount assembly. In one embodiment, the mount assembly of the main frame component further includes a plurality of mount holes enabling different types of vehicles to be hitched to the combination farming implement.

In one embodiment, the cultivator of the combination farming implement includes a tool bar, which is affixed to one side of the rotating framework. In one embodiment, the cultivator includes a plurality of shanks, which are affixed to the tool bar, and a tool bar dogleg, which is affixed to a central area of the tool bar. In one embodiment, the tool bar dogleg protrudes outward from the tool bar in the direction of the operational ends of the plurality of shanks. In one embodiment, the cultivator further includes a center shank affixed to the tool bar dogleg, wherein the center shank is of a different size than the plurality of shanks, such that the operational ends of the plurality of shanks and the operational end of the center shank lie in approximately the same horizontal plane.

In one embodiment, the combination farming implement comprises a rotating framework, a hydraulic rotational mechanism, a cultivator, and a scraper. In one embodiment, the cultivator and the scraper are attached to opposite sides of the rotating framework such that when an operational portion of the cultivator is positioned for performing a cultivation function on a surface, an operational portion of the scraper is positioned 180 degrees from the operational portion of the cultivator with the operational portion of the scraper facing away from the surface. In one embodiment, upon activation of the hydraulic rotational mechanism, the rotating framework, the cultivator, and the scraper are rotated 180 degrees about a central axis of the rotating framework such that, after completion of the 180 degree rotation, the operational portion of the scraper is positioned for performing a scraping function on a surface and the operational portion of the cultivator is positioned 180 degrees from the operational portion of the scraper with the operational portion of the cultivator facing away from the surface.

In one embodiment, when the rotational mechanism of the combination farming implement is a hydraulic rotational mechanism, the cultivator of the combination farming implement includes one or more of shanks, tines, S-tines, discs, tine rakes, and a harrow basket. Further, the scraper of the combination farming implement is selected from the group of scraper components containing box scrapers, blade scrapers, angled blade scrapers, and land levelers.

In one embodiment, when the rotational mechanism of the combination farming implement is a hydraulic rotational mechanism, the combination farming implement further comprises a main frame including a center hinge pipe, wherein the rotating framework is rotatably coupled to the center hinge pipe such that, upon activation of the hydraulic rotational mechanism, the rotating framework, the cultivator, and the scraper are rotated 180 degrees about the central hinge pipe.

In one embodiment, when the rotational mechanism of the combination farming implement is a hydraulic rotational mechanism, the hydraulic rotational mechanism includes a modified hydraulic ram pivot arm coupled to the center hinge pipe of the main frame. In one embodiment, an upper end of a first hydraulic ram is mounted at a first upper location on the modified hydraulic ram pivot arm, a lower end of the first hydraulic ram is mounted at a location on the main frame, an upper end of a second hydraulic ram is mounted at a second upper location on the modified hydraulic ram pivot arm, and a lower end of the second hydraulic ram is mounted to a portion of the rotating framework.

In one embodiment, upon activation of the hydraulic rotational mechanism, the first hydraulic ram retracts fully to achieve a first 90 degrees of rotation, and the second hydraulic ram extends fully to achieve a second 90 degrees of rotation. In one embodiment, upon activation of the rotational mechanism, the first hydraulic ram extends fully to achieve a first 90 degrees of rotation, and the second hydraulic ram retracts fully to achieve a second 90 degrees of rotation.

In one embodiment, the main frame component further includes a modified main support gusset. In one embodiment, the main frame of the combination farming implement further includes a mount assembly. In one embodiment, the mount assembly of the main frame component further includes a plurality of mount holes enabling different types of vehicles to be hitched to the combination farming implement.

In one embodiment, a system for cultivating and scraping a surface comprises a vehicle, and a combination farming implement hitched to the vehicle. In one embodiment, the combination farming implement that is hitched to the vehicle comprises a rotating framework, a rotational mechanism, a cultivator, and a scraper. In one embodiment, the cultivator and the scraper are attached to opposite sides of the rotating framework such that when an operational portion of the cultivator is positioned for performing a cultivation function on a surface, an operational portion of the scraper is positioned 180 degrees from the operational portion of the cultivator with the operational portion of the scraper facing away from the surface. In one embodiment, upon activation of the rotational mechanism, the rotating framework, the cultivator, and the scraper are rotated 180 degrees about an axis of rotation of the rotating framework such that, after completion of the 180 degree rotation, the operational portion of the scraper is positioned for performing a scraping function on a surface and the operational portion of the cultivator is positioned 180 degrees from the operational portion of the scraper, with the cultivator facing away from the surface.

In one embodiment, the surface is selected from the group of surfaces consisting of a soil surface, a dirt surface, a gravel surface, a field surface, a lawn surface, a garden surface, a parking lot surface, an arena surface; and an event grounds surface.

In one embodiment, the combination farming implement of the system for cultivating and scraping a surface further includes a main frame including a center hinge pipe, wherein the rotating framework is rotatably coupled to the center hinge pipe such that, upon activation of the rotational mechanism, the rotating framework, the cultivator, and the scraper are rotated 180 degrees about the central hinge pipe. In one embodiment, the main frame of the combination farming implement further includes a mount assembly. In one embodiment, the mount assembly of the main frame further includes a plurality of mount holes enabling the vehicle to be hitched to the combination farming implement.

Consequently, the embodiments disclosed herein provide technical solutions to the technical problems presented by the current and traditional options for performing cultivation and scraping tasks, options which result in significant waste of time, money, energy, and storage space, and also carry significant safety risks to the individuals responsible for performing these tasks. Further, as discussed in more detail above, using the above embodiments, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A combination farming implement comprising:
   a rotating framework;
   a rotational mechanism;
   a scraper; and
   a cultivator, wherein the cultivator includes:
      a tool bar affixed to one side of the rotating framework;
      a plurality of shanks affixed to the tool bar;
      a tool bar dogleg affixed to a central area of the tool bar, the tool bar dogleg protruding outward from the tool bar in the direction of the operational ends of the plurality of shanks; and
      a center shank affixed to the tool bar dogleg, wherein the center shank is of a different size than the plurality of shanks, such that the operational ends of the plurality of shanks and the operational end of the center shank lie in approximately the same horizontal plane, and further wherein:
   the cultivator and the scraper are attached to opposite sides of the rotating framework such that when an operational portion of the cultivator is positioned for performing a cultivation function on a surface, an operational portion of the scraper is positioned 180 degrees from the operational portion of the cultivator, such that the operational portion of the scraper is facing away from the surface; and
   upon activation of the rotational mechanism, the rotating framework, the cultivator, and the scraper are rotated 180 degrees about a central axis of the rotating framework such that, after completion of the 180 degree rotation, the operational portion of the scraper is positioned for performing a scraping function on a surface and the operational portion of the cultivator is positioned 180 degrees from the operational portion of the scraper, such that the operational portion of the cultivator is facing away from the surface.

2. The combination farming implement of claim 1 wherein the cultivator includes one or more of:
   shanks;
   tines;
   S-tines;
   discs;
   tine rakes; and
   a harrow basket.

3. The combination farming implement of claim 1 wherein the scraper is selected from the group of scrapers consisting of:
   box scrapers;
   blade scrapers;
   angled blade scrapers; and
   land levelers.

4. The combination farming implement of claim 1 wherein the rotational mechanism is a mechanical rotational mechanism.

5. The combination farming implement of claim 1 wherein the rotational mechanism is a pneumatic rotational mechanism.

6. The combination farming implement of claim 1 wherein the rotational mechanism is a hydraulic rotational mechanism.

7. The combination farming implement of claim 6 wherein the hydraulic rotational mechanism further includes one or more hydraulic rams.

8. The combination farming implement of claim 1, further comprising:
   a main frame including a center hinge pipe, wherein the rotating framework is rotatably coupled to the center hinge pipe such that, upon activation of the rotational mechanism, the rotating framework, the cultivator, and the scraper are rotated 180 degrees about the central hinge pipe.

9. The combination farming implement of claim 8 wherein the main frame further includes a mount assembly.

10. The combination farming implement of claim 9 wherein the mount assembly further includes a plurality of mount holes enabling different types of vehicles to be hitched to the combination farming implement.

* * * * *